(12) United States Patent
Kuze et al.

(10) Patent No.: US 8,164,998 B2
(45) Date of Patent: Apr. 24, 2012

(54) OPTICAL DISC DEVICE

(75) Inventors: Yuuichi Kuze, Osaka (JP); Akira Yoshikawa, Nara (JP); Katsuya Watanabe, Nara (JP)

(73) Assignee: Panasonic Corporation, Osaka (JP)

( * ) Notice: Subject to any disclaimer, the term of this patent is extended or adjusted under 35 U.S.C. 154(b) by 350 days.

(21) Appl. No.: 12/302,068

(22) PCT Filed: Feb. 8, 2008

(86) PCT No.: PCT/JP2008/000192
§ 371 (c)(1),
(2), (4) Date: Nov. 24, 2008

(87) PCT Pub. No.: WO2008/099590
PCT Pub. Date: Aug. 21, 2008

(65) Prior Publication Data
US 2009/0290463 A1 Nov. 26, 2009

(30) Foreign Application Priority Data
Feb. 14, 2007 (JP) ................................ 2007-033181

(51) Int. Cl.
*G11B 20/18* (2006.01)
(52) U.S. Cl. ................ 369/53.17; 369/47.14; 369/53.15; 369/53.2
(58) Field of Classification Search ............... 369/53.17, 369/47.14, 53.15, 53.2
See application file for complete search history.

(56) References Cited

U.S. PATENT DOCUMENTS

| 4,508,450 | A | | 4/1985 | Ohshima et al. |
| 5,303,219 | A | | 4/1994 | Kulakowski et al. |
| 5,854,777 | A | * | 12/1998 | Kawamura et al. ........ 369/53.15 |

(Continued)

FOREIGN PATENT DOCUMENTS

JP 01-253638 10/1989

(Continued)

OTHER PUBLICATIONS

Extended European Search Report for corresponding application No. 08710346.1 issued Apr. 2, 2009.

(Continued)

*Primary Examiner* — Wayne Young
*Assistant Examiner* — Brenda Bernardi
(74) *Attorney, Agent, or Firm* — Renner, Otto, Boisselle & Sklar, LLP

(57) ABSTRACT

The optical disc apparatus of this invention includes: an optical pickup, which irradiates an optical disc with a light beam and generates a light detection signal based on the beam reflected from the disc; a search section, which controls the pickup before data is written on a storage area of the disc, thereby adjusting the beam spot location and searching a reference one of information layers stacked for a defective area in the storage area of the disc; a defect decision section for detecting an error based on the detection signal and determining a portion of the storage area, where the error has occurred, as the defective area; a defect size measuring section for measuring the size of the defective area in an area of the reference layer and generating a defect information list indicating there is the defective area in the area of the reference layer; and a recording range control section for managing, by reference to the list, the storage area such that no data will be written on a perpendicularly projected area defined by projecting the defective area of the reference layer perpendicularly to another information layer.

15 Claims, 27 Drawing Sheets

U.S. PATENT DOCUMENTS

| | | | |
|---|---|---|---|
| 7,215,619 B1 * | 5/2007 | Van Den Enden | 369/53.15 |
| 7,577,065 B2 * | 8/2009 | Kuroda et al. | 369/47.3 |
| 2002/0015378 A1 | 2/2002 | Komaki et al. | |
| 2003/0137910 A1 | 7/2003 | Ueda et al. | |
| 2004/0027974 A1 | 2/2004 | Hisada et al. | |
| 2004/0047278 A1 | 3/2004 | Komaki et al. | |
| 2004/0130986 A1 | 7/2004 | Minase et al. | |
| 2004/0228232 A1 * | 11/2004 | Takahashi et al. | 369/44.26 |
| 2005/0270953 A1 | 12/2005 | Okada et al. | |
| 2006/0007801 A1 | 1/2006 | Takashima | |
| 2007/0030773 A1 | 2/2007 | Kuroda et al. | |
| 2008/0089200 A1 * | 4/2008 | Neckmar | 369/53.2 |

FOREIGN PATENT DOCUMENTS

| | | | |
|---|---|---|---|
| JP | 5-210845 A | 8/1993 | |
| JP | 2003-323769 | 11/2003 | |
| JP | 2004-342221 | 12/2004 | |
| JP | 2006-024287 | 1/2006 | |
| JP | 2006-190378 | 7/2006 | |
| JP | 2006190378 A * | 7/2006 | |
| JP | 2007-334940 | 12/2007 | |
| JP | 2002-230834 | 8/2008 | |
| TW | 200531020 A | 9/2005 | |
| WO | 01/06510 | 1/2001 | |
| WO | 2004/019326 | 3/2004 | |
| WO | 2005/043534 | 5/2005 | |
| WO | 2005/088613 | 9/2005 | |

OTHER PUBLICATIONS

Taiwan Office Action for Taiwan Application No. 097104831 dated Jun. 9, 2011.

International Search Report for corresponding Application No. PCT/JP2008/000192 mailed May 20, 2008.

Form PCT/ISA/237 and partial English Translation.

Notice of Reasons for Rejection for corresponding Japanese Application No. 2008-558003 issued Feb. 7, 2012 and English translation.

* cited by examiner

FIG. 2
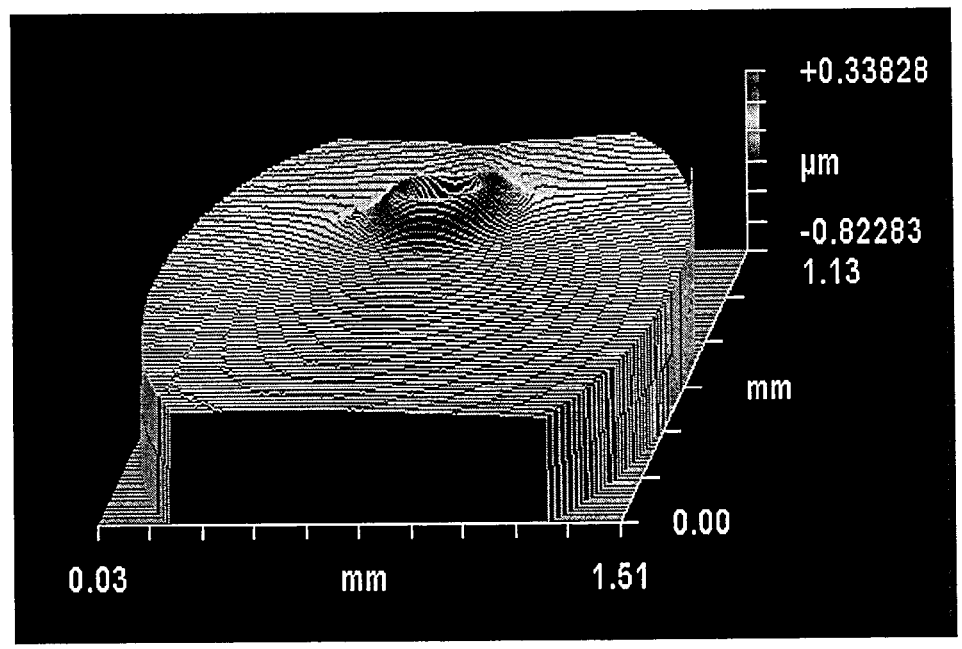
(a)
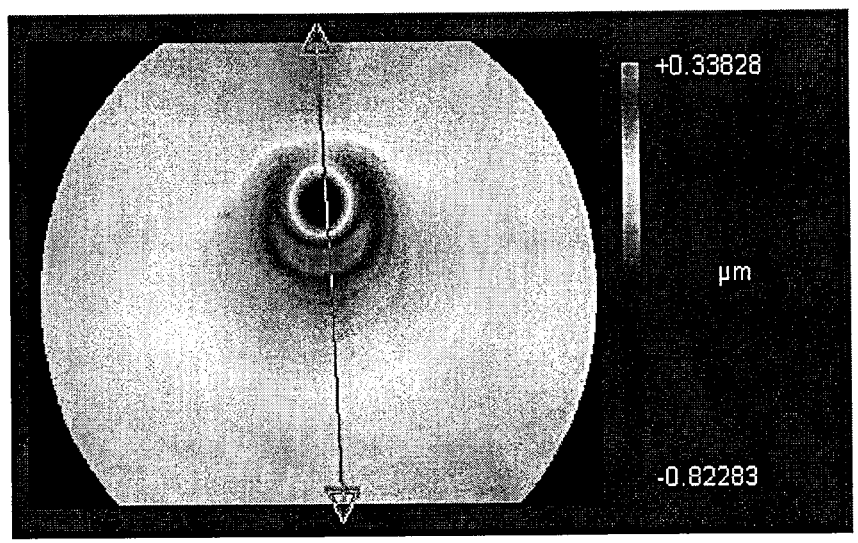
(b)

FIG. 4
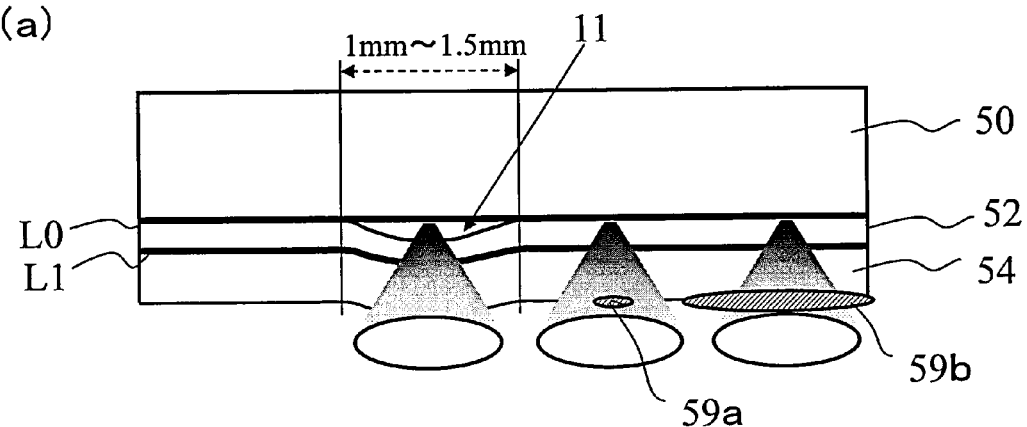
(a)
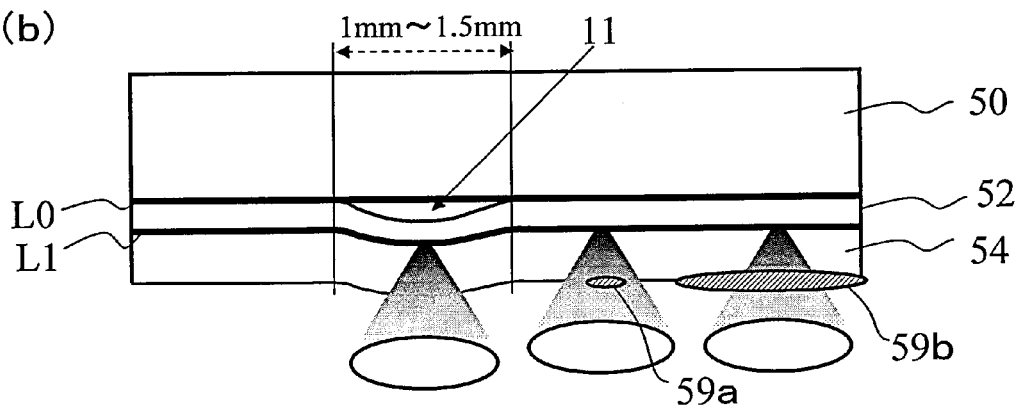
(b)
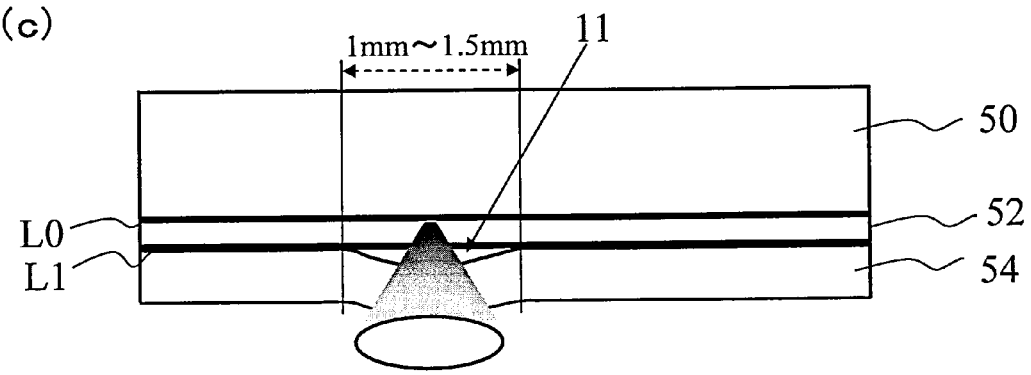
(c)

FIG. 6
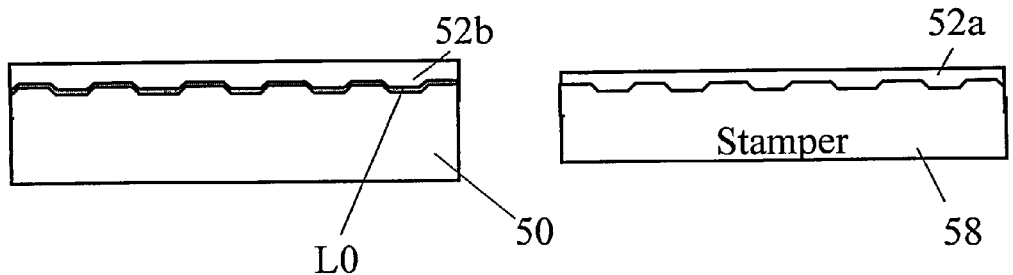
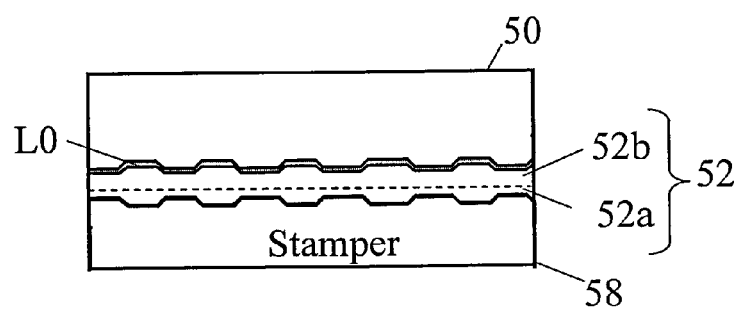
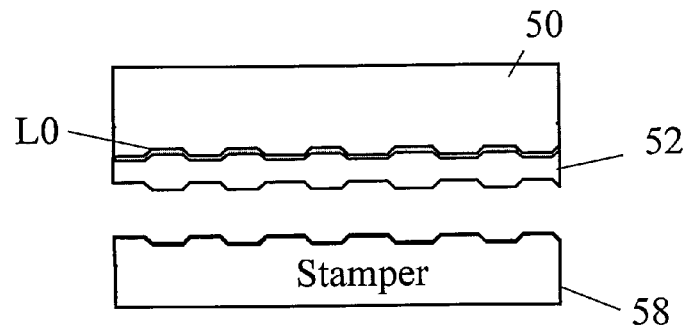
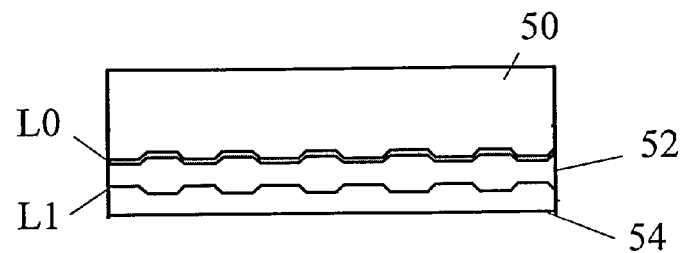

FIG. 17
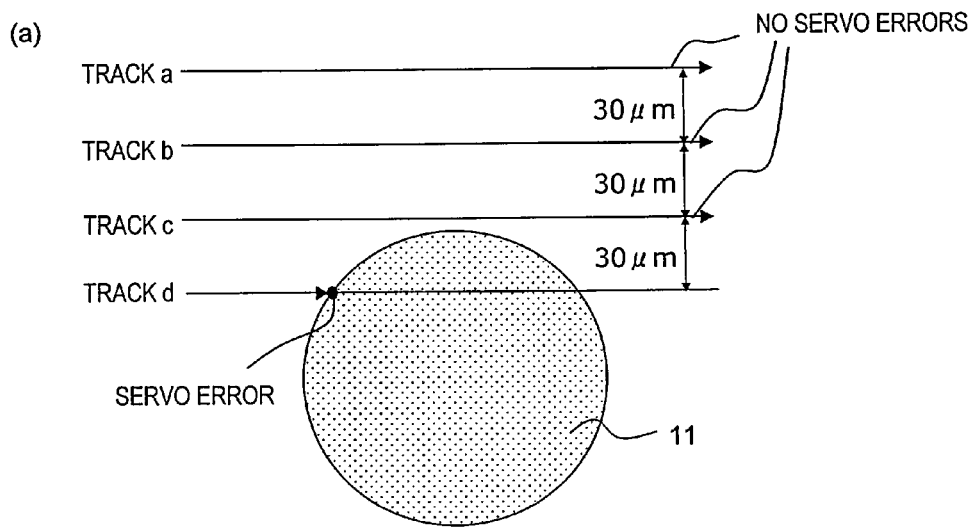
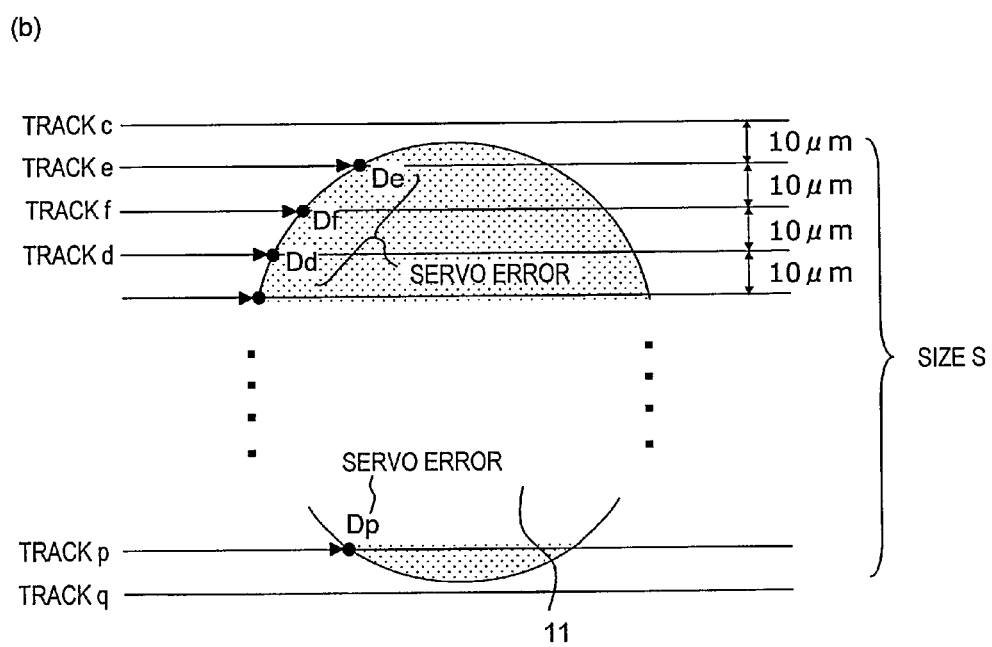

FIG. 20
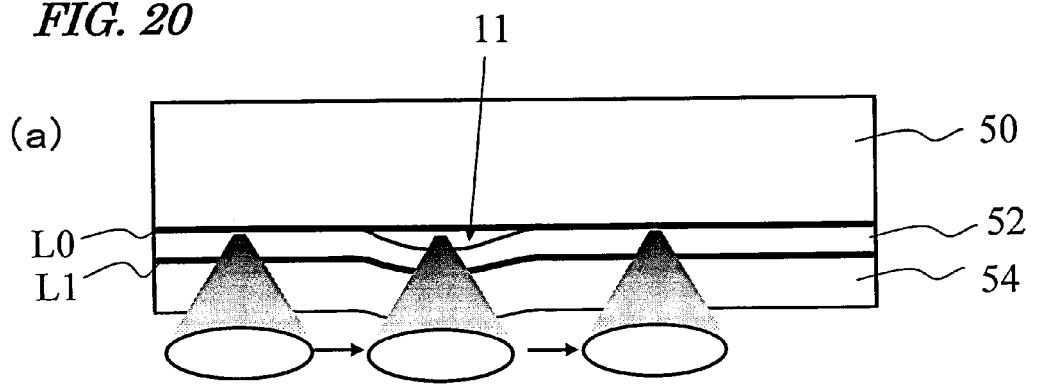
(a)
TE
FE
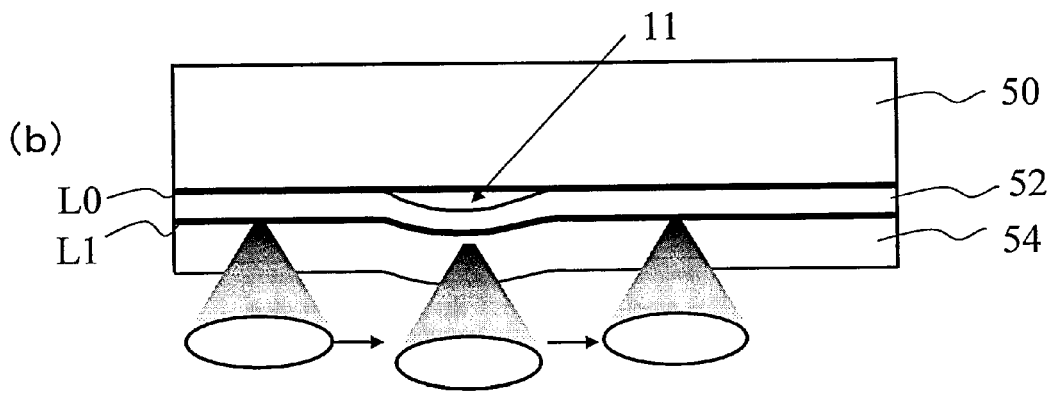
(b)
TE
FE

OPTICAL DISC DEVICE

TECHNICAL FIELD

The present invention relates to an optical disc apparatus and a method for managing defects on an optical disc. More particularly, the present invention relates to a technique for managing storage areas such that no data is written on an area with a large-scale defect such as a bubble in a situation where the defective area causes a write error over multiple information layers that are stacked one upon the other in an optical disc. The present invention also relates to a technique for accessing a bubble-free area with good stability by moving between the information layers while avoiding such a defective area.

BACKGROUND ART

Known optical discs are information storage media with a sector structure. Optical discs are roughly classifiable into the following three types according to property. A first type is read-only optical discs in which data is stored by the unevenness of their surface and to which the user is not allowed to add any new data. A second type is write-once optical discs, which include a recording film of an organic dye, for example, and on which data can be written only once. And a third type is rewritable optical discs, which include a recording film of a phase change material, for example, and on which data can be written a number of times (i.e., rewritten).

As audiovisual data including audio data and video data (which will be collectively referred to herein as "AV data") is recently broadcast or downloaded in the digital format more and more often, there is a growing demand for optical discs with even higher storage densities and even bigger storage capacities. To increase the storage capacity, it is an effective measure to take to provide multiple information layers for a single disc. For example, in a DVD as a read-only optical disc, the single optical disc is provided with two information layers, thereby almost doubling the storage capacity compared to an optical disc with only one information layer. Furthermore, a Blu-ray Disc (BD) that was developed just recently has storage density per information layer that is approximately five times as high as that of a DVD, thereby realizing a huge storage capacity of 50 GB by the two information layers combined. And to further increase the storage capacity, discs with four or even six information layers are now under research and development.

As the storage capacities have been increased in this manner by providing an increasing number of information layers for a single disc, more and more new methods for managing optical disc areas have been proposed. For example, Patent Document No. 1 discloses an optical disc area management method for reading a defective area more quickly even in a situation where the defect list area of the reference layer (i.e., the first information layer) of a multilayer optical disc has become no longer available because that layer is already full or has a defect itself. Meanwhile, Patent Document No. 2 discloses an optical disc area management method for writing data in real time on a BD-R, which is a write-once medium (i.e., a storage medium on which data can be written only once), and for reading the stored data even more accurately.

Patent Document No. 1: Japanese Patent Application Laid-Open Publication No. 2003-323769
Patent Document No. 2: Japanese Patent Application Laid-Open Publication No. 2006-24287

DISCLOSURE OF INVENTION

Problems to be Solved by the Invention

In a BD, the protective coating to receive an incoming laser beam (i.e., a light-transmitting layer arranged between its surface on the laser beam incoming side and its information layer) has a thickness of 0.1 mm, which is extremely thin. A spin-coating method is known as a technique for forming such a thin protective coating.

If the spin-coating method is adopted, however, the air may get trapped between the light-transmitting layer and the substrate itself to produce a bubble there in some cases. In an optical disc like a BD that has a thinner light-transmitting layer and a narrower track pitch, the presence of a bubble will warp the light-transmitting layer and cause the layer to lose its planarity locally. Furthermore, the area with the bubble becomes a large-scale defective area that covers several tens or even several hundreds of clusters or tracks. It can be said that the frequency of occurrence of such large-scale defective areas on BDs has been rising. Such bubbles have also been produced in CDs and DVDs but have hardly affected those conventional optical discs because CDs and DVDs have a sufficiently thick light-transmitting layer.

In a BD, tracking and focus jump operations are affected by such a bubble, although the bubble has never been an issue in CDs or DVDs. However, if optical discs with such bubbles were thrown away as defective products, then it would raise the manufacturing cost of BDs significantly and would prevent valuable resources from being used effectively. That is why to cut down the manufacturing cost of BDs, it is strongly recommended to get even an optical disc with bubbles driven with good stability.

An object of the present invention is to provide an optical disc apparatus that predicts, in a reference one of multiple information layers that are stacked one upon the other, whether or not an error will be caused by a defective area with a bubble, for example, before data is actually written there and that manages the storage areas such that no data will be written in a perpendicularly projected area of the other information layers, which is defined by projecting the defective area of the reference layer perpendicularly, once an error has occurred.

Means for Solving the Problems

An optical disc apparatus according to the present invention can read and/or write data from/on an optical disc with multiple information layers that are stacked one upon the other. The apparatus includes: an optical pickup, which irradiates the optical disc with a light beam and which generates a light detection signal based on the light beam that has been reflected from the optical disc; a search section, which controls the optical pickup before data is written on a storage area of the optical disc, thereby adjusting the location of the light beam on the optical disc and searching a reference one of the multiple information layers stacked for a defective area in the storage area of the optical disc; a defect decision section for detecting an error based on the light detection signal and determining a portion of the storage area, where the error has occurred, as the defective area; a defect size measuring section for measuring the size of the defective area in an area of the reference layer and generating a defect information list indicating that there is the defective area in the area of the reference layer; and a recording range control section for managing, by reference to the defect information list, the storage area such that no data will be written on a perpendicularly projected area, which is defined by projecting the defective area of the reference layer perpendicularly to another information layer.

In one preferred embodiment, the defect size measuring section generates, in advance, the defect information list that indicates there is a defective area in the perpendicularly projected area that is defined by projecting the defective area of the reference layer perpendicularly to that another information layer.

In an alternative preferred embodiment, every time any error occurs, the defect size measuring section generates the defect information list that indicates there is a defective area in the perpendicularly projected area that is defined by projecting the defective area of the reference layer perpendicularly to that another information layer.

In another preferred embodiment, the recording range control section includes a layer-to-layer jump range control section for controlling an access sequence by reference to the defect information list such that no layer-to-layer jump is made to the perpendicularly projected area that is defined by projecting the defective area of the reference layer perpendicularly to that another information layer.

In still another preferred embodiment, the reference layer is a first information layer that is located at the deepest level.

In yet another preferred embodiment, the defect decision section determines a portion of the storage area, where a predicted type of error unique to the defective area has occurred, as the defective area.

In this particular preferred embodiment, the defect decision section detects a servo error based on the duration of a period in which the signal level of a servo signal, generated from the light detection signal with a predetermined aberration given to the light beam, is greater than a predetermined threshold value, and determines an area where the servo error has occurred as the defective area.

In a specific preferred embodiment, the defect decision section changes the threshold values according to the intended use of the optical disc.

In yet another preferred embodiment, the layer-to-layer jump range control section defines a jumping prohibited area with a predetermined margin added for the defective area of the reference layer and for the perpendicularly projected area defined by projecting the defective area perpendicularly to the another information layer, and prohibits making any layer-to-layer jump within the jumping prohibited area.

In yet another preferred embodiment, the layer-to-layer jump range control section defines, as a jumping prohibited period, a predetermined period including a period of time it takes for the light beam to pass the defective area of the reference layer and the perpendicularly projected area defined by projecting the defective area perpendicularly to the another information layer.

In a specific preferred embodiment, the predetermined margin is determined by the degree of eccentricity of the optical disc.

An optical disc tester according to the present invention is designed to test an optical disc with multiple information layers that are stacked one upon the other. The tester includes: an optical pickup, which irradiates the optical disc with a light beam and which generates a light detection signal based on the light beam that has been reflected from the optical disc; a search section, which controls the optical pickup, thereby adjusting the location of the light beam on the optical disc and searching a reference one of the multiple information layers stacked for a defective area in a storage area of the optical disc; a defect decision section for detecting an error based on the light detection signal and determining a portion of the storage area, where the error has occurred, as the defective area; a defect size measuring section for measuring the size of the defective area in an area of the reference layer and generating a defect information list indicating that there is the defective area in the area of the reference layer; and a writing section for writing the defect information list on a predetermined area on the optical disc.

An optical disc apparatus driving method according to the present invention is a method for driving an optical disc apparatus that writes data on an optical disc with multiple information layers that are stacked one upon the other. The method includes the steps of: retrieving a defect information list from a predetermined area on the optical disc; and managing, by reference to the defect information list, a storage area such that no data will be written on a defective area of one of the information layers with a defect or on a perpendicularly projected area, which is defined by projecting the defective area perpendicularly to another information layer.

An optical disc according to the present invention has multiple information layers that are stacked one upon the other. Information about the location of a defective area, which has been detected in a reference one of the information layers, and information about the location of a perpendicularly projected area, which is defined by projecting the defective area perpendicularly to another information layer, are stored in at least one of the multiple information layers.

Effects of the Invention

An optical disc apparatus according to the present invention searches a reference one of multiple information layers stacked for a defective area before data is written on the storage area thereof. If any defective area has been detected, the apparatus measures its size. And the apparatus manages the storage area such that no data will be written on a perpendicularly projected area, which is defined by projecting the defective area of the reference layer perpendicularly to another information layer. That is to say, according to the present invention, it is the reference layer, not any other information layer, that is searched for any defective area before data is written.

According to the present invention, data can be written with not just a defective area in the reference layer but also the perpendicularly projected area, which is defined by projecting the defective area from the reference layer to another information layer, avoided, thus getting the data written smoothly on any arbitrary information layer. That will contribute effectively to improving the performance of an optical disc apparatus to write data in real time, in particular.

On top of that, since the apparatus of the present invention measures the size of the defective area and then manages the storage area such that no data will be written on the defective area, there is no need to avoid the defective areas excessively. That is why the storage area of a given optical disc can be used effectively. Also, by performing an access control so as to prevent the light beam from moving between the layers while passing through any defective area, it is possible to avoid an unwanted situation where a large-scale defect such as a bubble produced inside an optical disc (which will be referred to herein as an "internal defect") varies the layer-to-layer distance to cause some instability in the movement of the light beam or a situation where a bubble causes a disturbance in the FE signal to affect the stability of a focus finding operation on a desired layer. As a result, the read/write performance on a multilayer disc can be improved.

BRIEF DESCRIPTION OF DRAWINGS

Portion (a) of FIG. 1 is a schematic representation of an optical disc with bubbles and portion (b) of FIG. 1 is an enlarged view thereof showing a relation between the bubbles and tracks.

FIGS. 2(a) and 2(b) illustrate the shape of a raised portion that was actually formed on the surface of a BD (i.e., on the surface of its light transmitting layer) due to the production of a bubble.

FIGS. 4(a), 4(b) and 4(c) are schematic cross-sectional views illustrating the influences of a bubble on a dual-layer disc.

FIGS. 6(a) through 6(d) illustrate a preferred embodiment of a dual-layer disc manufacturing process.

Figure 10:
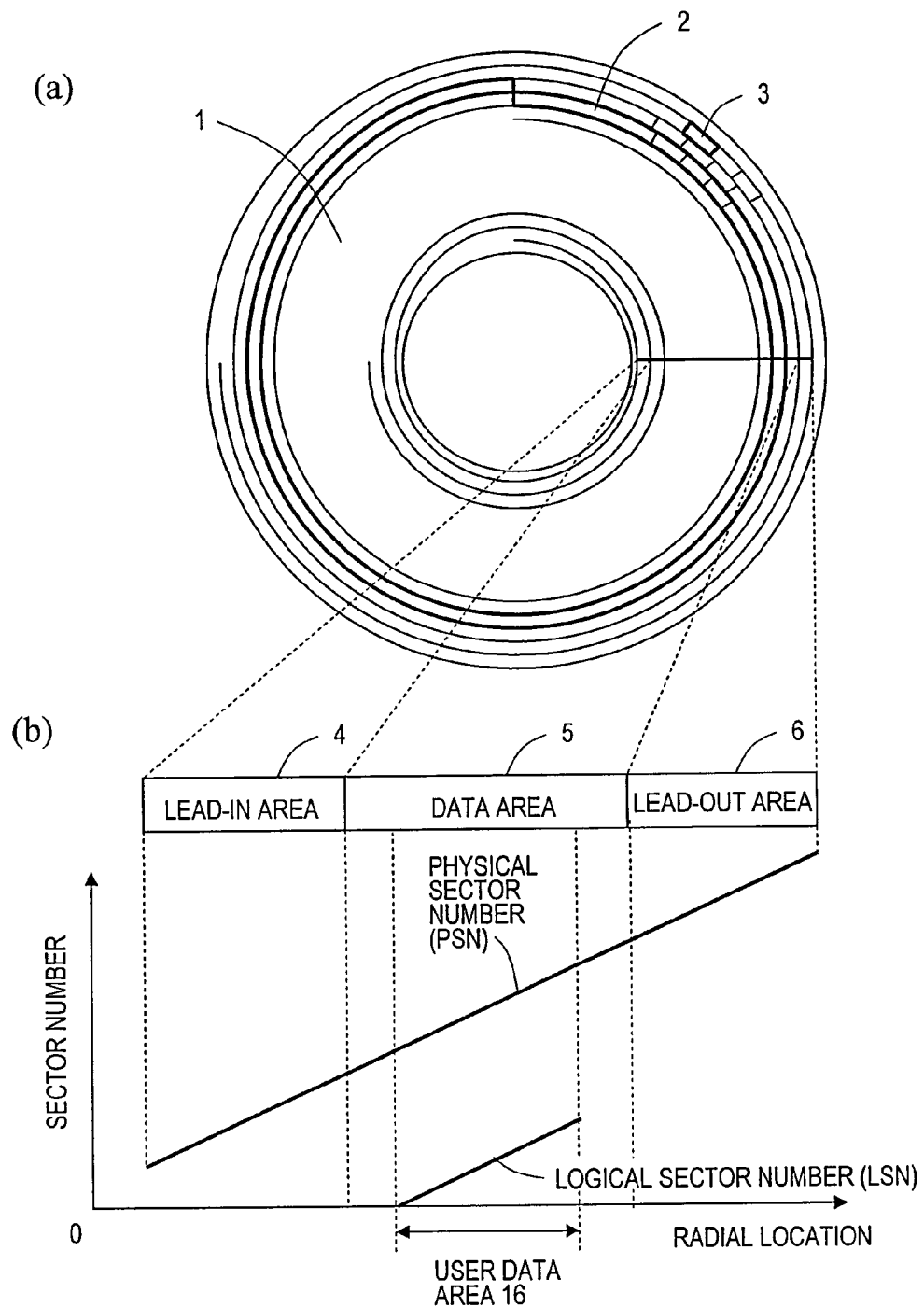

Portions (a) and (b) of FIG. 10 respectively illustrate the physical and logical structures of a multilayer disc 1.

Figure 11:
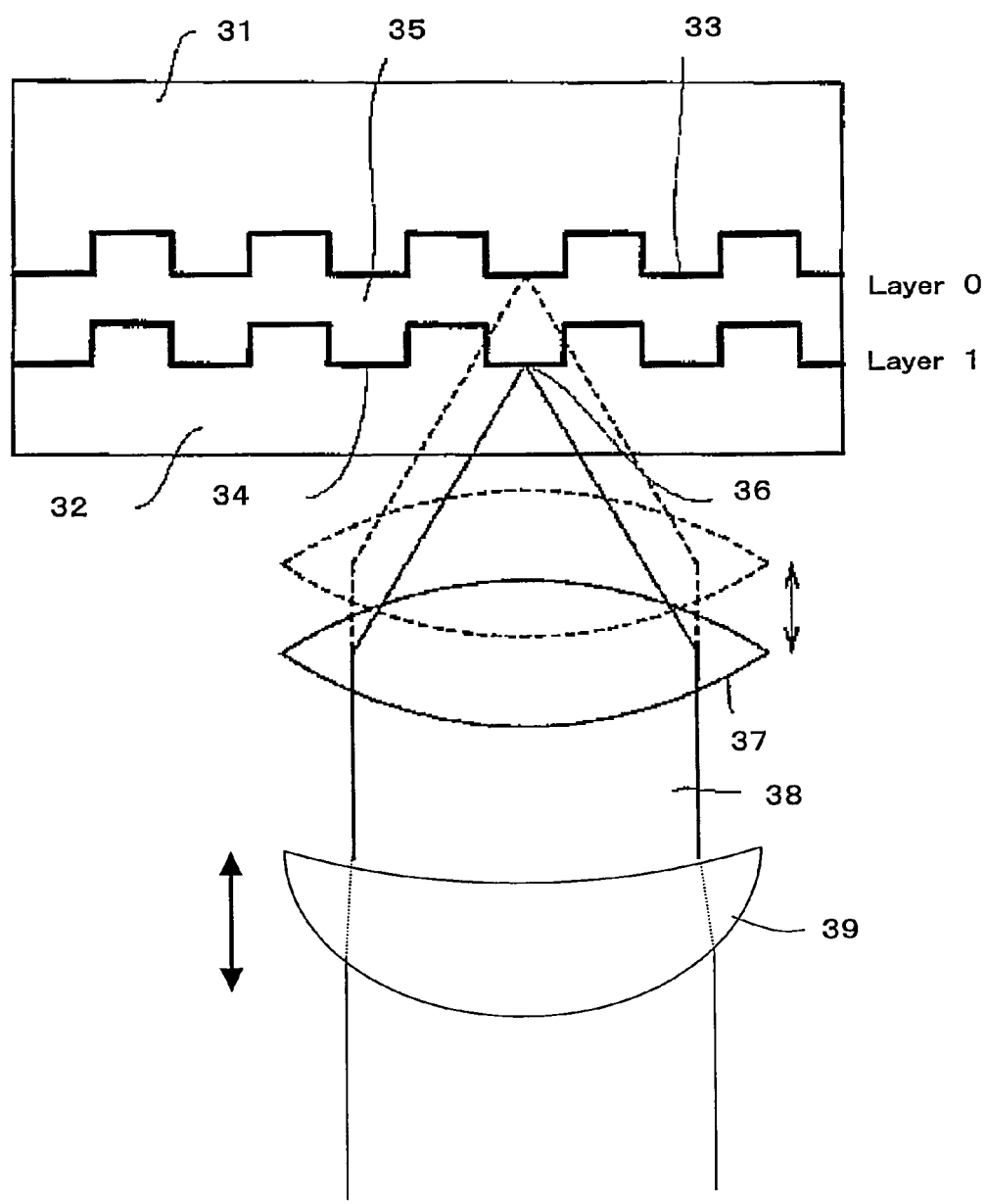

FIG. 11 shows how in principle a read operation is performed on an optical disc with two information layers.

FIGS. 12(a) and 12(b) illustrate the respective groove patterns of the second and first information layers of a DVD with parallel paths, FIG. 12(c) shows optical disc scanning directions of a DVD with the parallel paths, and FIG. 12(d) shows sector numbers that are assigned to the parallel paths of a DVD.

FIGS. 13(a) and 13(b) illustrate the respective groove patterns of the second and first information layers of a DVD with opposite paths, FIG. 13(c) shows optical disc scanning directions of a DVD with the opposite paths, and FIG. 13(d) shows sector numbers that are assigned to the opposite paths of a DVD.

Figure 14:
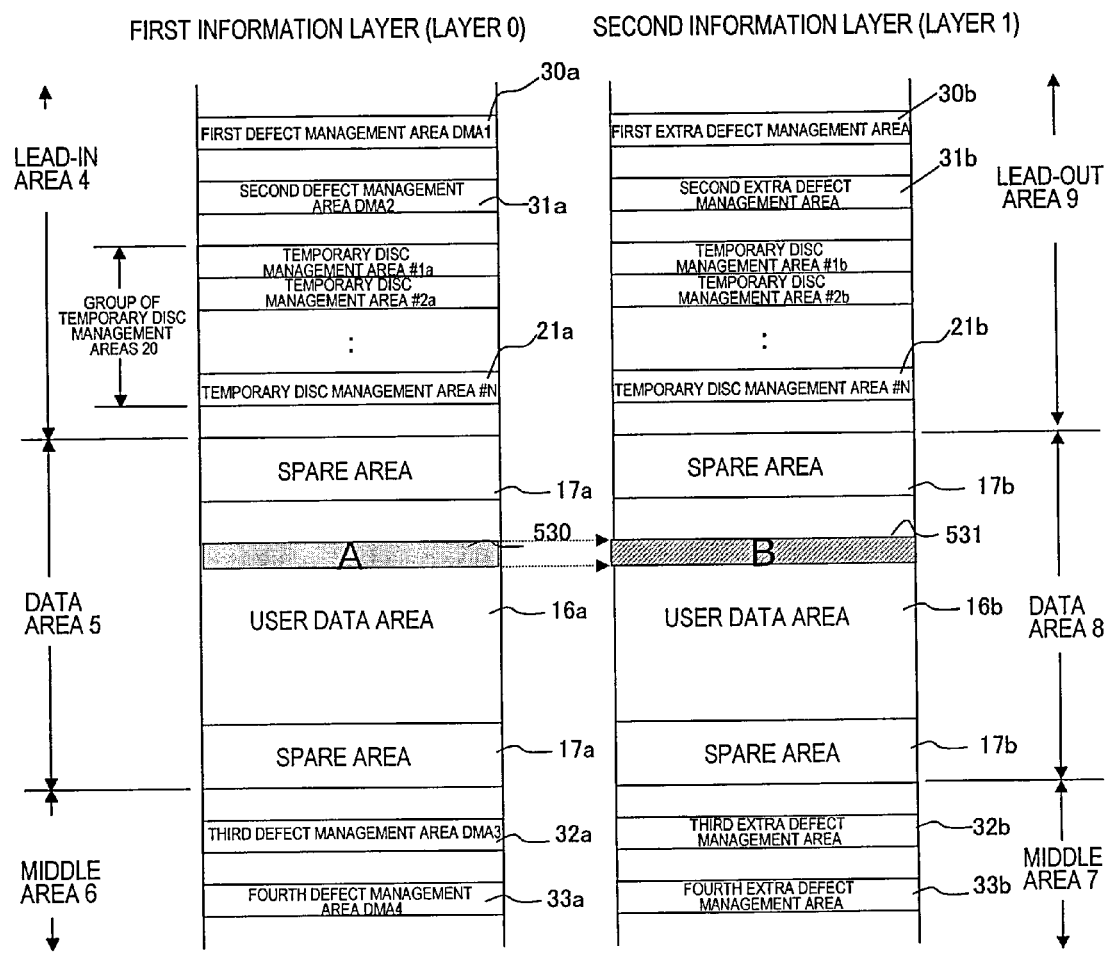

FIG. 14 shows a detailed data structure of the multilayer disc 1 shown in FIG. 11.

Figure 15:
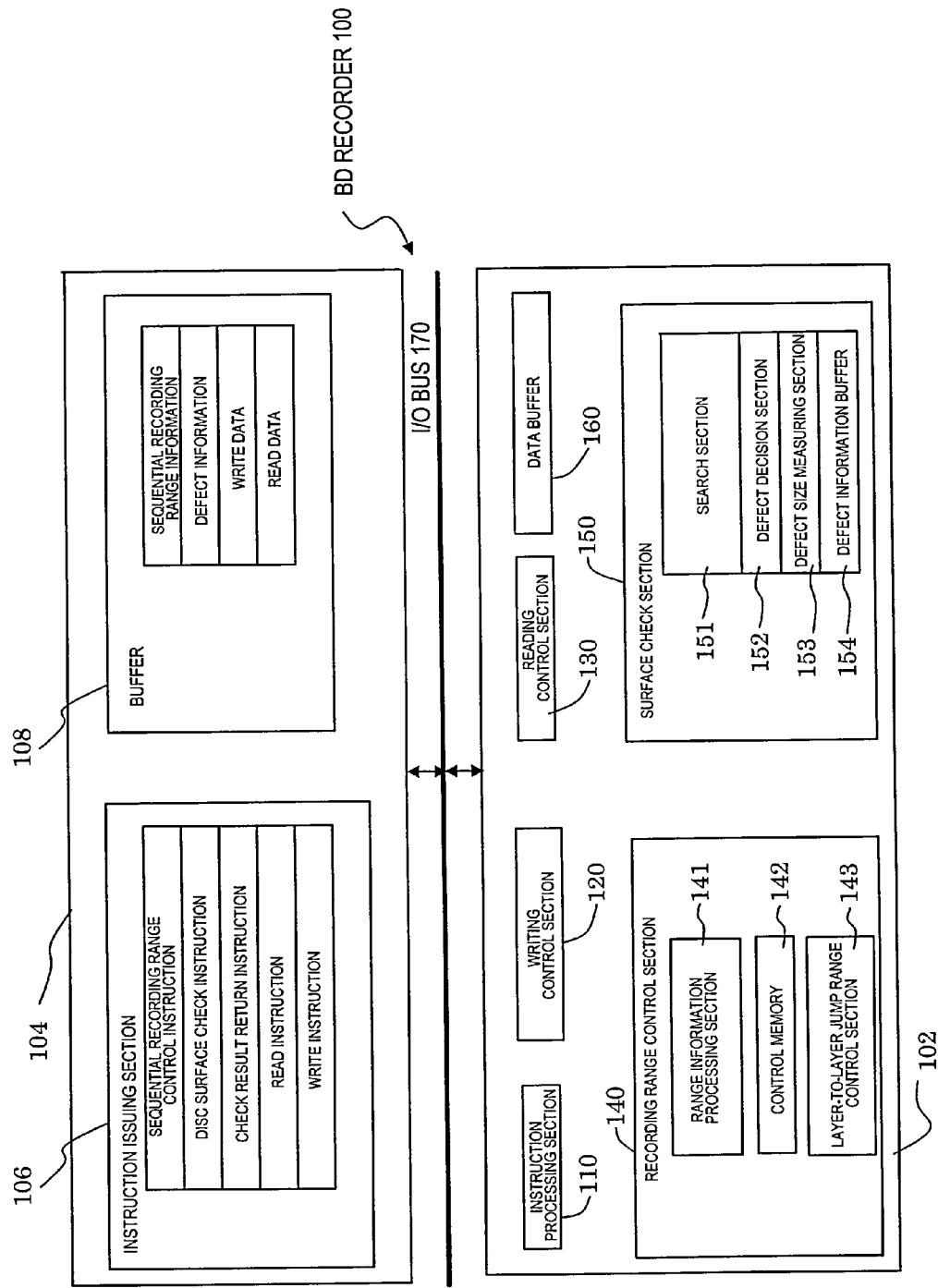

FIG. 15 illustrates an arrangement of functional blocks for a BD recorder 100.

Figure 16:
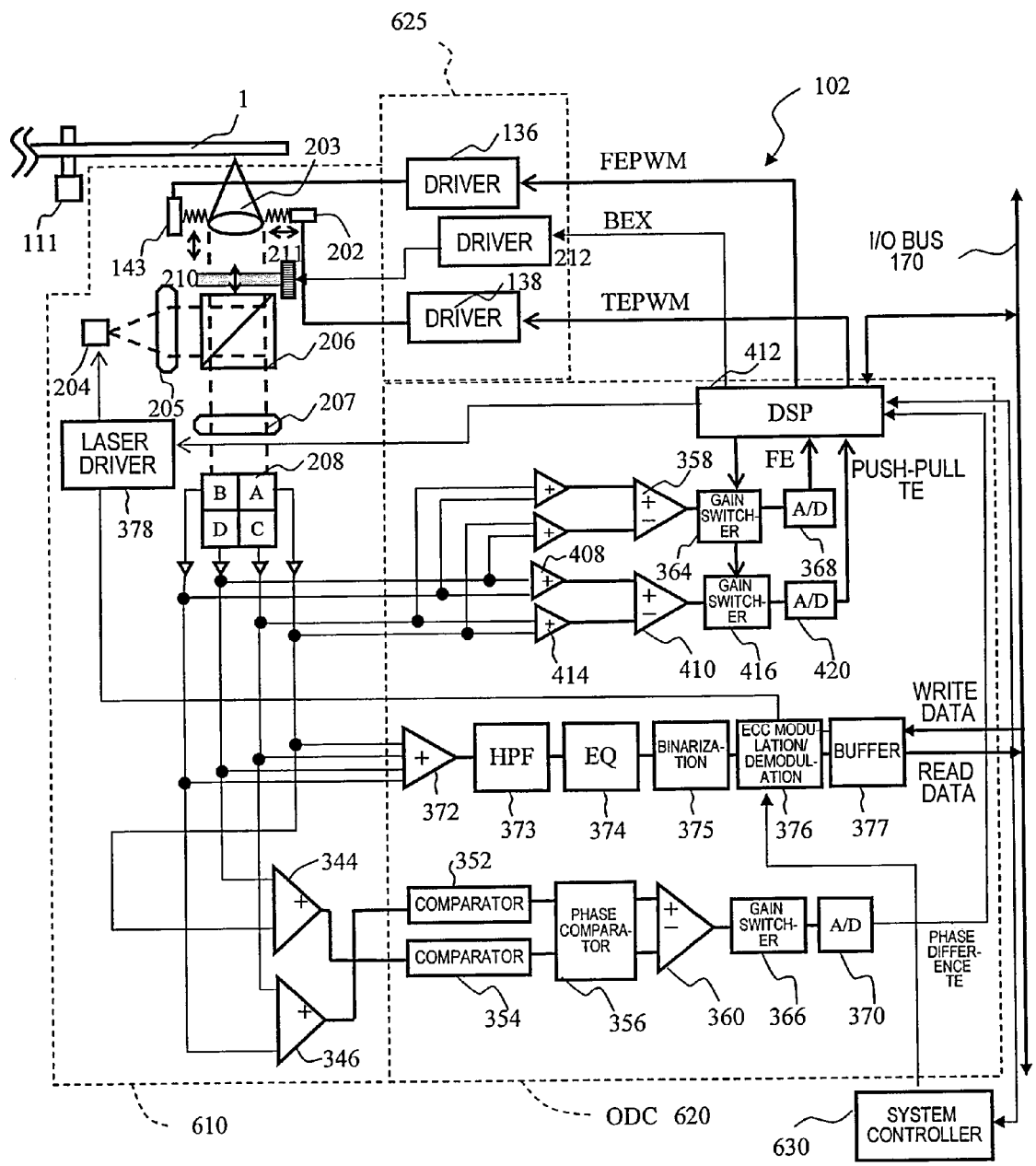

FIG. 16 illustrates an exemplary hardware configuration for an optical disc drive 102 as a preferred embodiment of the present invention.

FIGS. 17(a) and 17(b) are schematic representations illustrating the concept of the optical disc surface check processing of this preferred embodiment.

Figure 18:
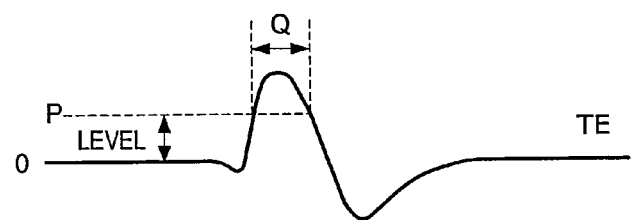

FIG. 18 shows the waveform of a tracking error signal with a servo error.

Figure 19:
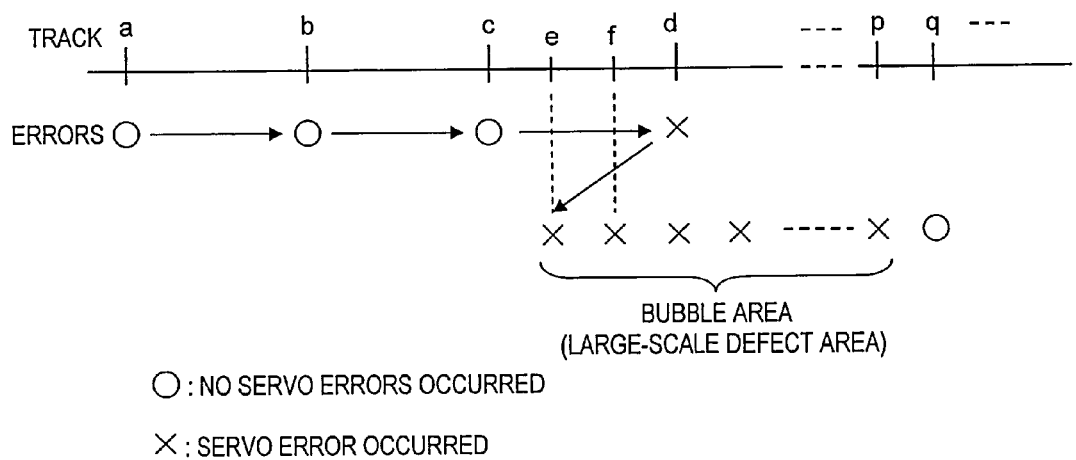

FIG. 19 shows the time series of the respective servo error detection processing steps that have been described with reference to FIGS. 17(a) and 17(b), respectively.

FIGS. 20(a) and 20(b) show how the waveforms of FE and TE signals vary when a light beam passes through a bubble area.

Figure 21:
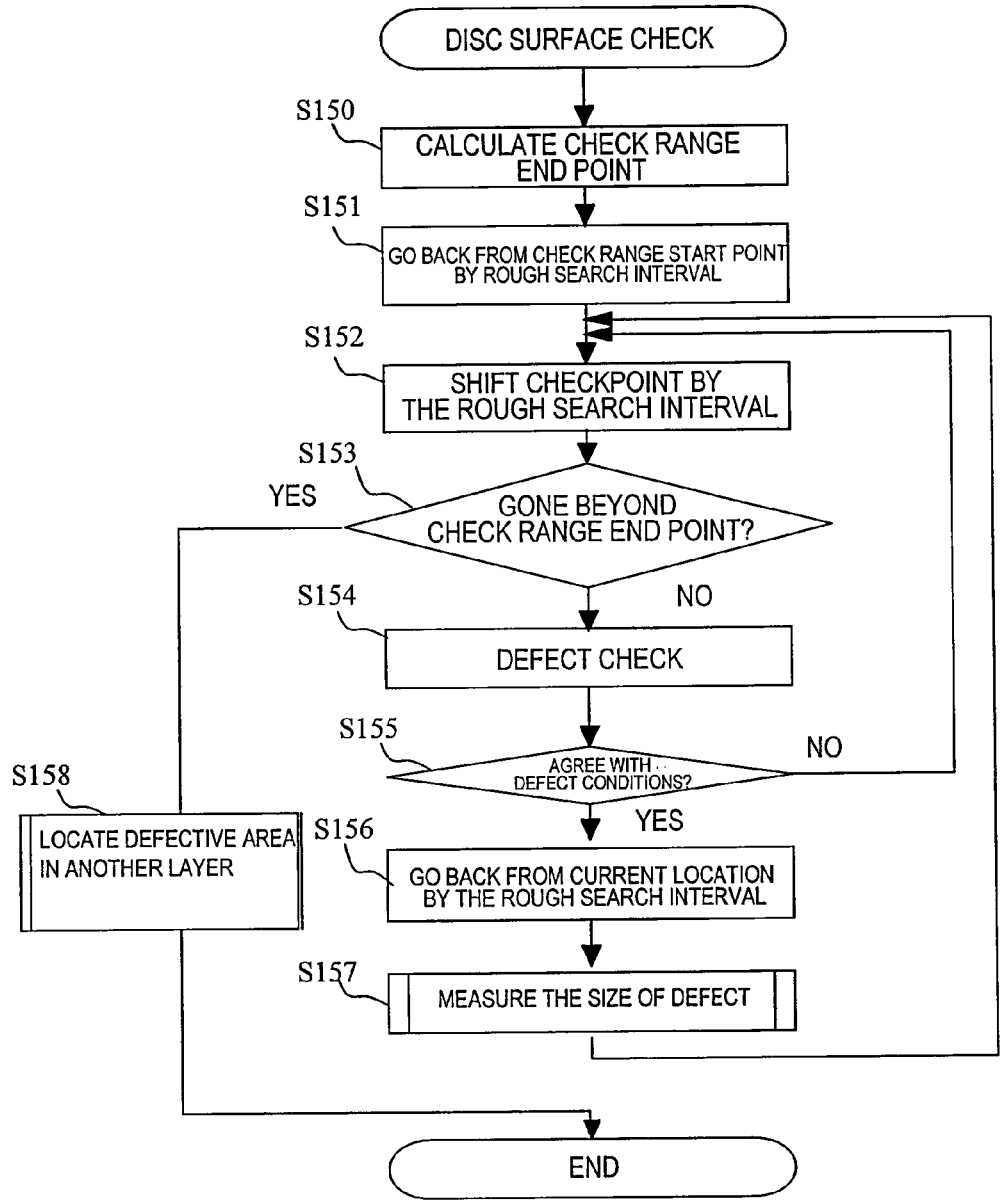

FIG. 21 is a flowchart showing the procedure of the optical disc surface check processing.

Figure 22:
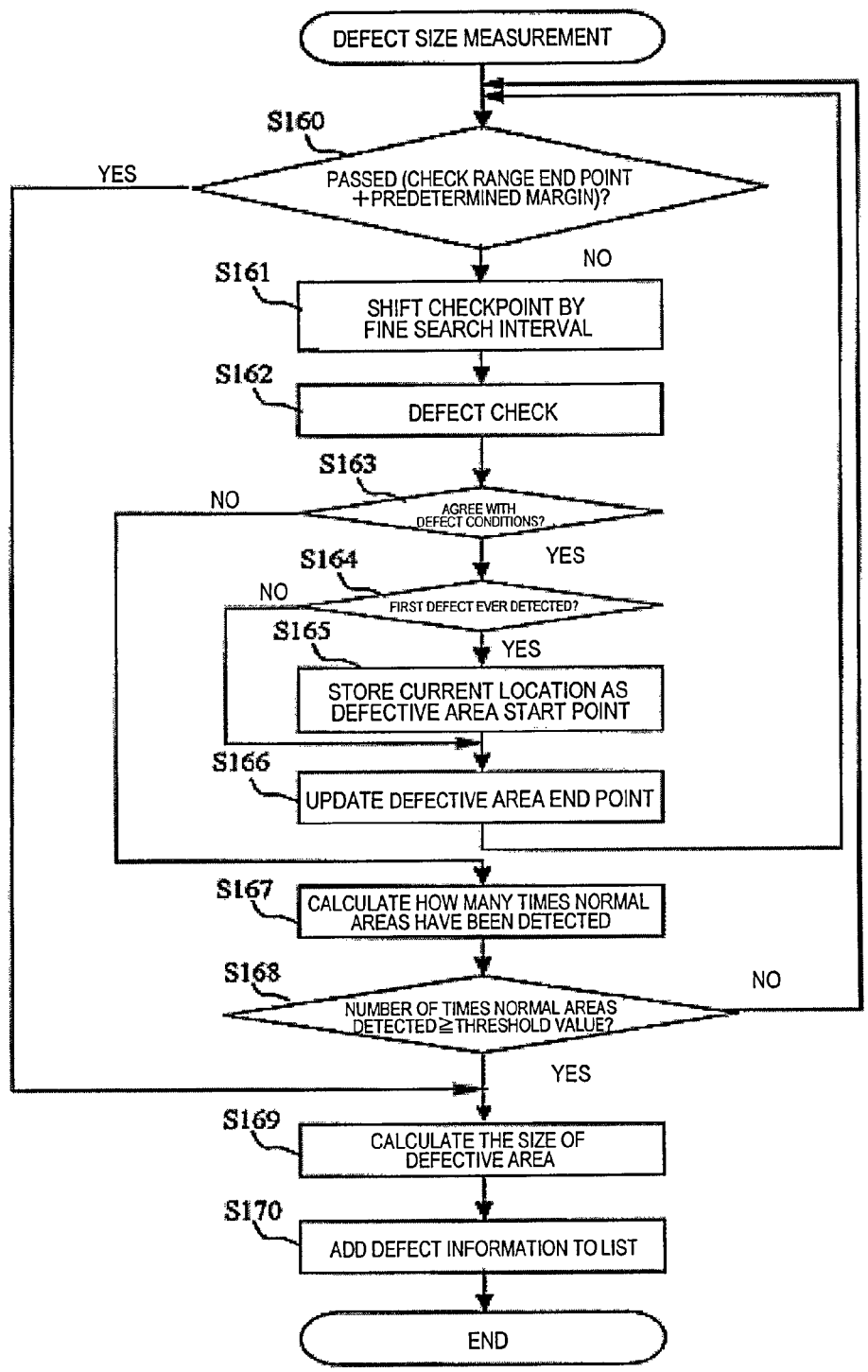

FIG. 22 is a flowchart showing the procedure of defective area size measuring processing.

Figure 23:
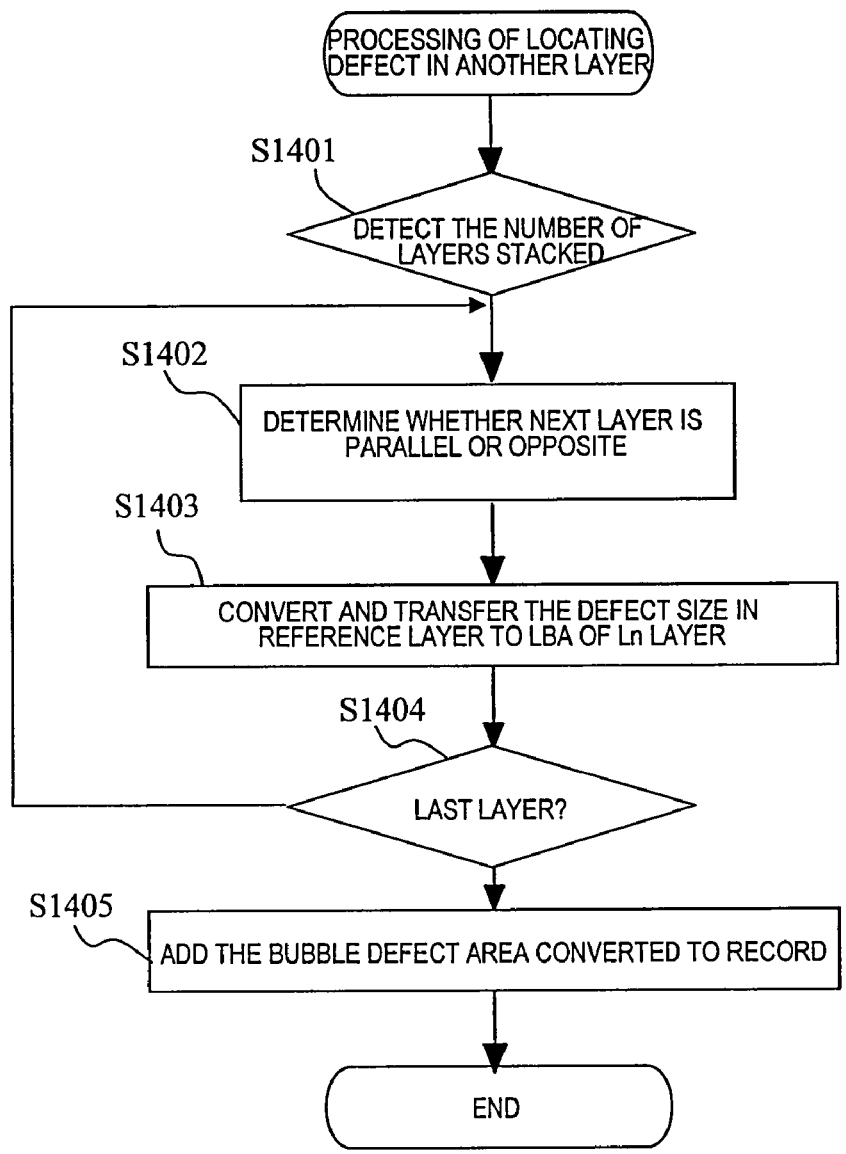

FIG. 23 is a flowchart showing the procedure of the processing to be done to locate a defective area in another layer.

Figure 24:
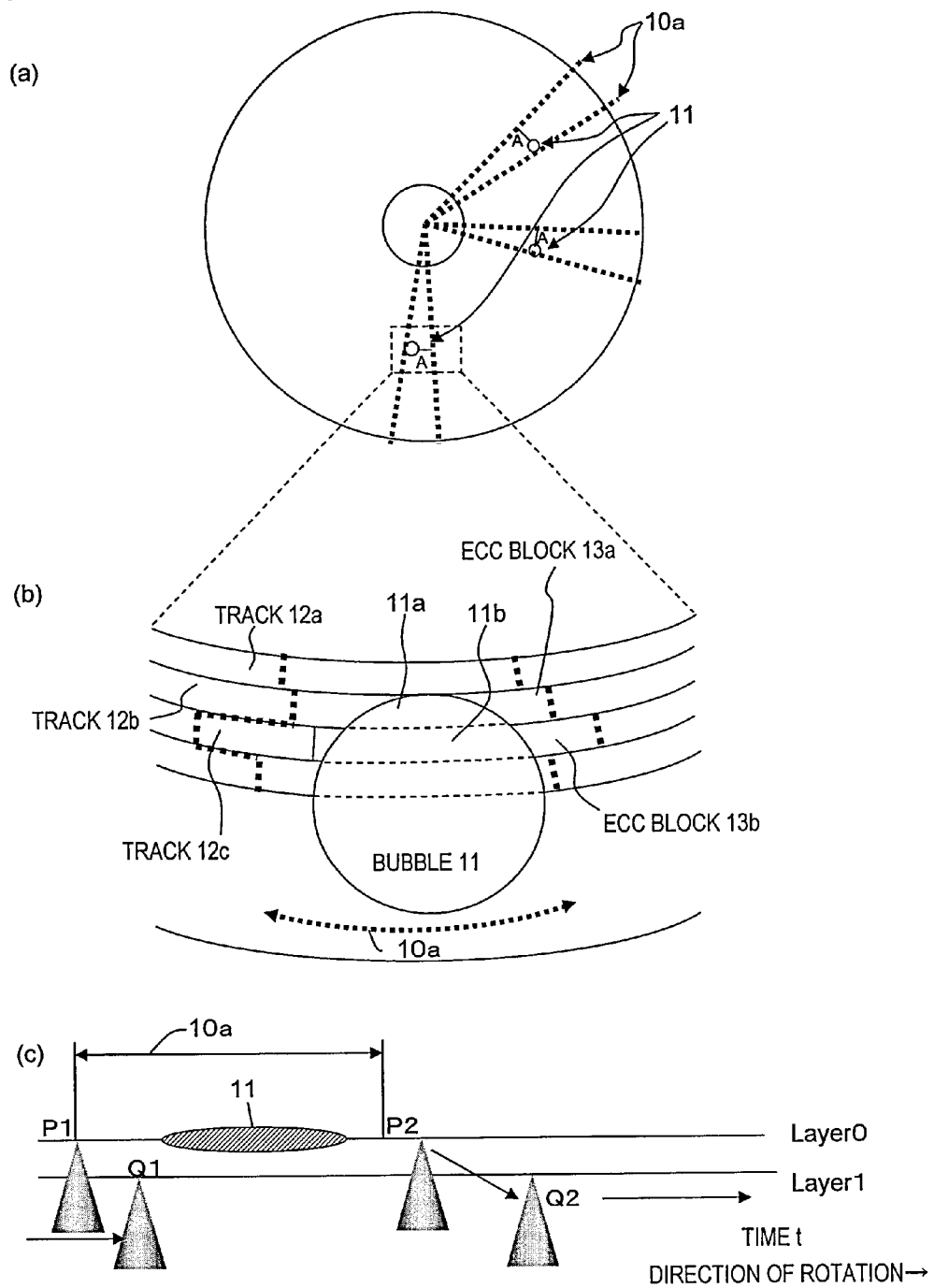

Portions (a) through (c) of FIG. 24 are schematic representations illustrating the processing and operation of a second preferred embodiment of the present invention.

Figure 25:
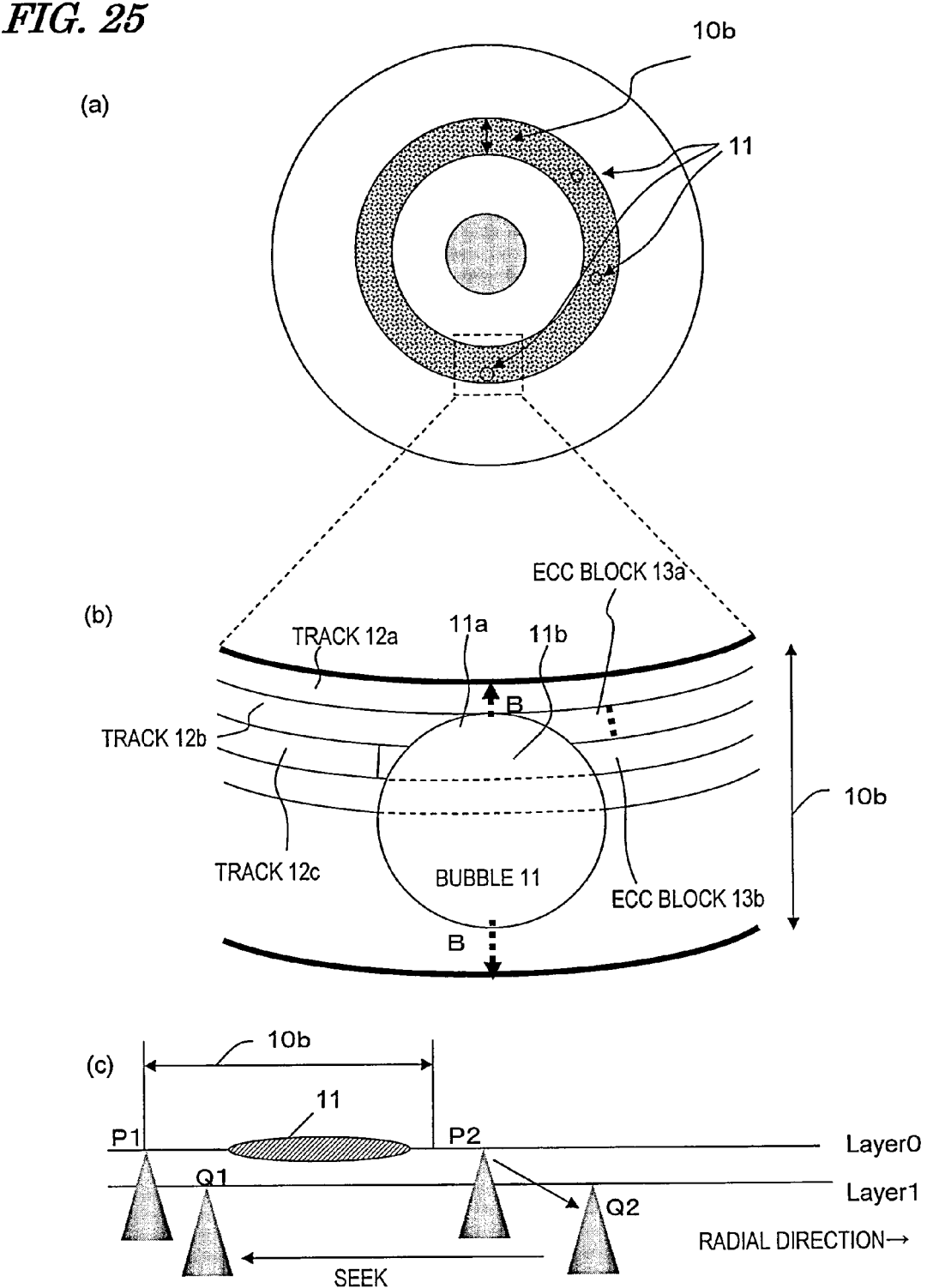

Portions (a) through (c) of FIG. 25 are schematic representations illustrating the processing and operation of the second preferred embodiment.

Figure 26:
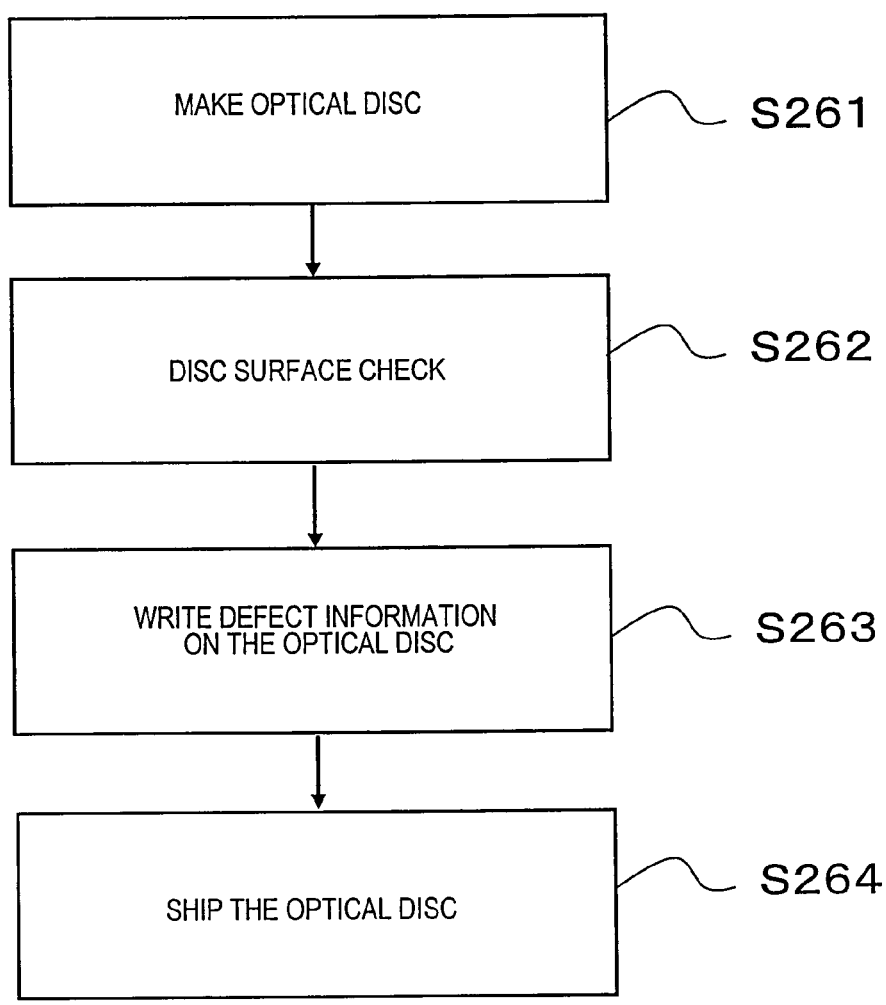

FIG. 26 is a flowchart showing the procedure of the second preferred embodiment.

Figure 27:
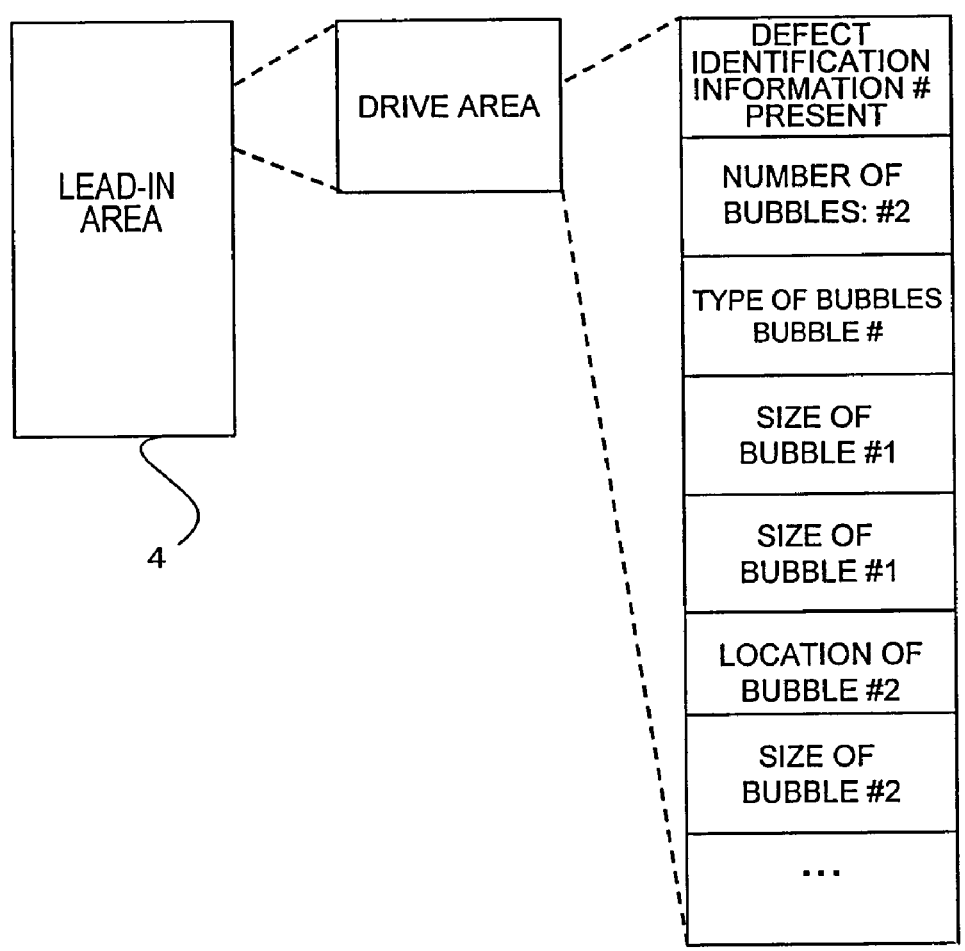

FIG. 27 shows an exemplary format for defect management information to be stored on an optical disc.

Figure 28:
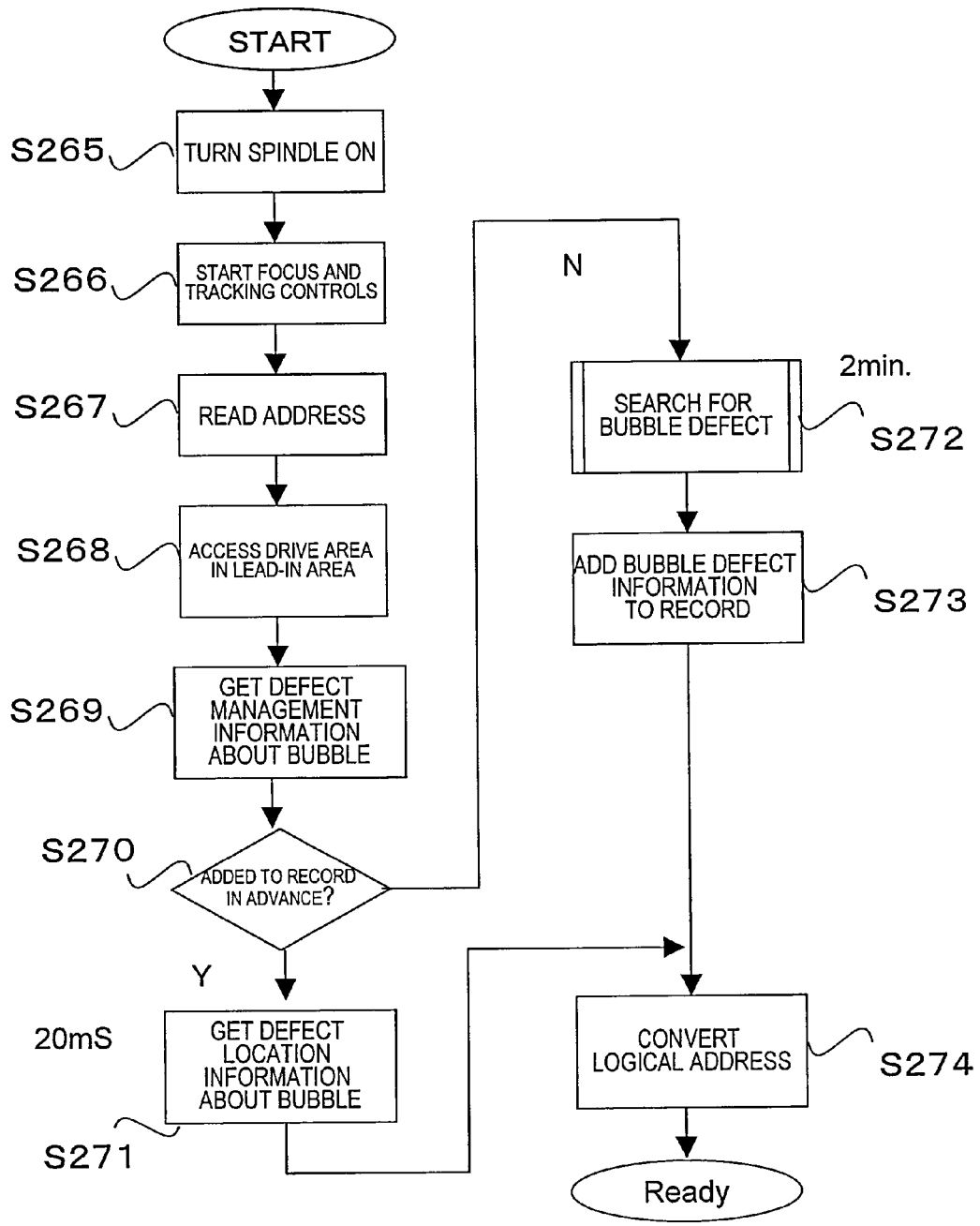

FIG. 28 is a flowchart showing how to drive an optical disc apparatus according to the present invention.

Figure 29:
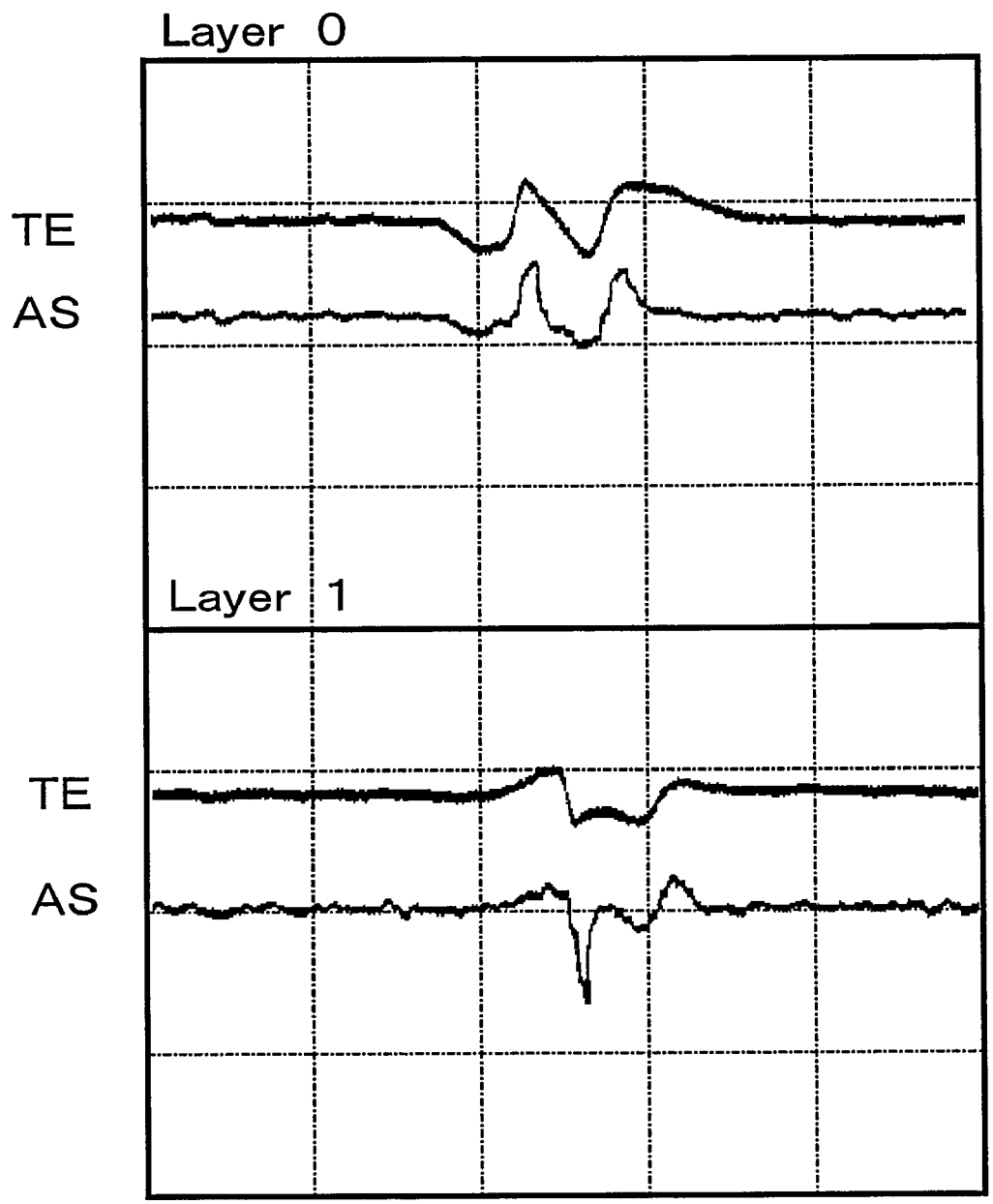

FIG. 29 shows the variations in the waveforms of a tracking error signal (TE) and a read signal (AS) that were actually obtained from an area of a dual-layer disc with a bubble.

DESCRIPTION OF REFERENCE NUMERALS

100 BD recorder
12 optical disc drive
104 high-order controller
106 instruction issuing section
108 buffer
110 instruction processing section
120 writing control section
130 reading control section
140 recording range control section
141 range information processing section
142 control memory
150 surface check section
151 search section
152 defect decision section
153 defect size measuring section
154 defect information buffer
160 data buffer
170 I/O bus

BEST MODE FOR CARRYING OUT THE INVENTION

Before preferred embodiments of the present invention are described, a bubble and a large-scale defective area formed by the bubble will be described first in further detail.

Figure 1:
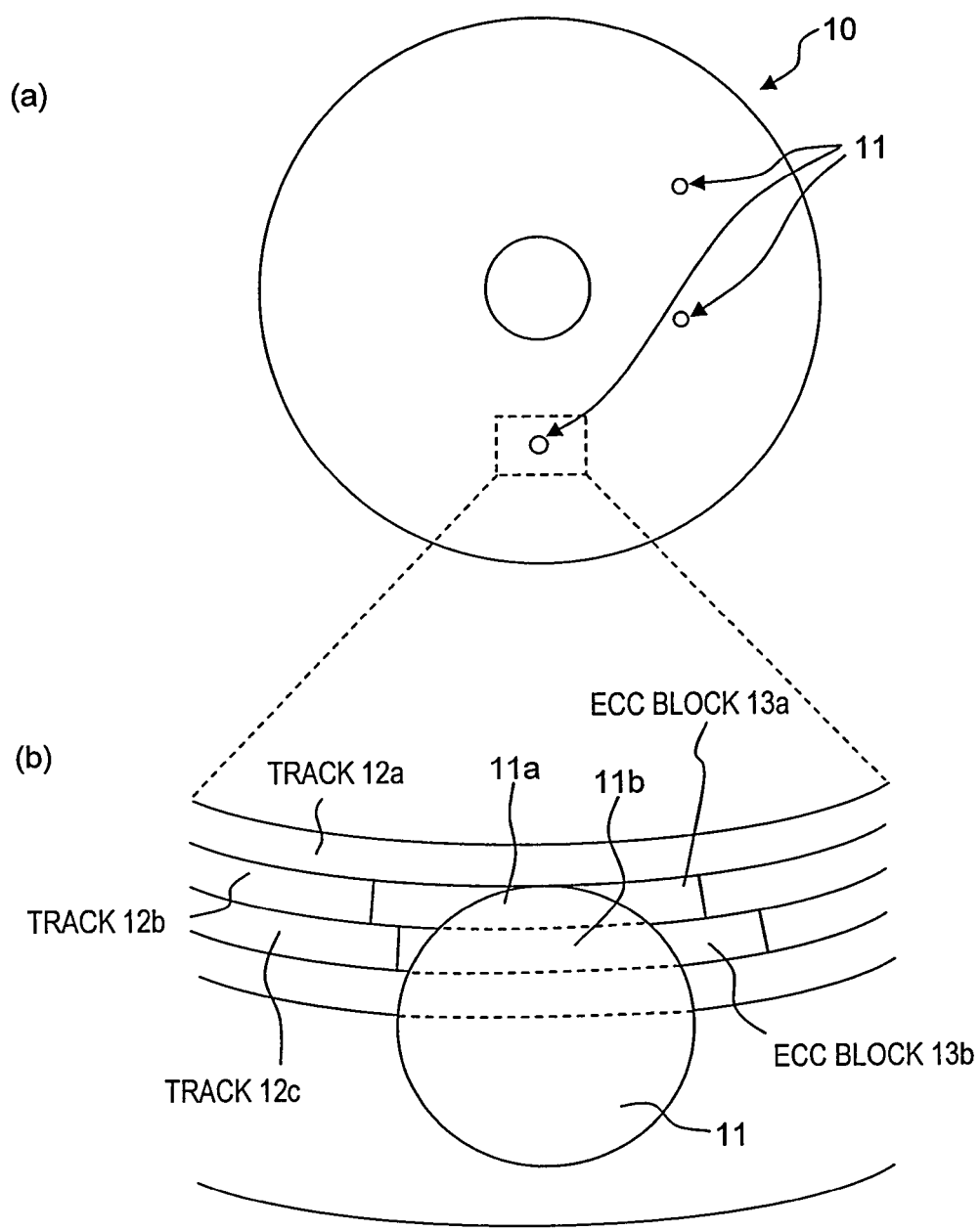

Portion (a) of FIG. 1 schematically illustrates the surface of a BD 10 as an optical disc with bubbles 11. In portion (a) of FIG. 1, the bubbles 11 are illustrated as visible ones to let the reader understand more easily how the present invention works. Actually, however, there are some invisible bubbles, too. FIGS. 2(a) and 2(b) illustrate the shape of a raised portion that was actually formed on the surface of a BD (i.e., on the surface of its light transmitting layer) due to the production of a bubble.

A bubble typically has a size (diameter) of approximately 500 µm to approximately 1,000 µm. If a bubble were produced between the information layer of a BD and the light-transmitting layer thereof, the surface of the light-transmitting layer would be raised locally as shown in FIGS. 2(a) and 2(b) because the light-transmitting layer has as small a thickness as approximately 100 µm. Almost no reflected light returns from the center (or the core) of the bubble but the light beam is not transmitted normally through the raised portion surrounding the bubble, either. The objective lens for use to perform a read/write operation on a BD has a high numerical aperture NA and forms a focal point on a shallow information layer under the surface of the disc. That is why even if the light-transmitting layer were warped only slightly, the spherical aberration would change significantly and the intensity of the reflected light would vary easily.

Such a bubble could also be produced in a multilayer disc with multiple information layers that are stacked one upon the other. Hereinafter, it will be described what problem would arise if a bubble were produced in a multilayer disc.

FIGS. 3(a) and 3(b) schematically illustrate the cross section of a single-layer disc and that of a dual-layer disc that has two information layers, respectively. In the single-layer disc shown in FIG. 3(a), a first information layer L0 thereof is covered with a light-transmitting layer 56 with a thickness of approximately 100 μm. On the other hand, in the dual-layer disc shown in FIG. 3(b), a first information layer L0 thereof is covered with a light-transmitting layer 52 with a thickness of approximately 25 μm and a second information layer L1 thereof is covered with a light-transmitting layer 54 with a thickness of approximately 75 μm. In the single-layer disc shown in FIG. 3(a), a bubble 11 has been produced between the first information layer L0, which is located at a depth of approximately 100 μm as measured from the surface of the optical disc, and the light-transmitting layer 56. On the other hand, in the dual-layer disc shown in FIG. 3(b), a bubble 11 has been produced between the first information layer L0, which is located at a depth of approximately 100 μm as measured from the surface of the optical disc, and the light-transmitting layer 52.

As shown in FIG. 3(b), if the bubble 11 got trapped between the optical disc substrate 50 of the dual-layer disc and the first information layer L0 thereof, the raised portion surrounding the bubble 11 would affect the second information layer L1, too, because the interval between the first and second information layers L0 and L1 is just 25 μm.

Likewise, even in a four-layer disc with four information layers, if a bubble 11 were produced in the vicinity of the first information layer L0 thereof, every other information layer would also be affected as shown in FIG. 3(c).

The present inventors discovered via experiments that no matter how deep under the surface of a multilayer disc a bubble 11 was produced, every information layer of that optical disc was affected by the bubble 11. Hereinafter, the reason will be described with reference to FIGS. 4(a) through 4(c).

As shown in FIG. 4(a), in a situation where a bubble 11 is present between the first information layer L0 and the light-transmitting layer 52, when a light beam is focused on the first information layer L0, the light beam will cross a raised portion (with a diameter of 1 mm to 1.5 mm) of the light-transmitting layer 54, which has been formed by the bubble 11. When a light beam passes through such a raised portion on the surface of an optical disc, the refraction direction will deviate in that raised portion. As a result, a "pseudo-component" (to be described later) will be produced in a tracking signal to be generated based on the light reflected from the information layer. It will be described in detail later exactly what harmful effects the pseudo component would produce.

On the other hand, even when the light beam is focused on the second information layer L1 of the optical disc shown in FIG. 4(a), the light beam will also cross the raised portion of the light-transmitting layer 54 that has been formed by the bubble 11 as shown in FIG. 4(b). As a result, the pseudo-component will also be produced in the tracking signal.

Furthermore, in a situation where a bubble 11 is present between the second information layer L1 and the light-transmitting layer 54, even when a light beam is focused on the first information layer L0, the light beam will also produce the pseudo-component in the tracking signal as shown in FIG. 4(c) when crossing the raised portion of the light-transmitting layer 54 that has been formed by the bubble 11.

As described above, no matter how deep the bubble 11 is located, when the light beam passes through an area that is defined by projecting the bubble 11 perpendicularly to each of the multiple information layers L0 and L1 (which will be sometimes referred to herein as a "bubble area"), some abnormality will arise in the tracking signal, for example.

Next, suppose there are some surface defects 59a and 59b such as scratches or dust on the surface of the optical disc. If there is a defect 59a, of which the size is smaller than the diameter of the light beam on the surface of the optical disc, then the light beam being transmitted is partially cut off by that defect 59a. As a result, no matter which of the two information layers L0 and L1 the light beam is now being focused on, a decrease in the intensity of the light reflected from the information layer L0 or L1 is seen in both cases. However, the degree of the decrease in light intensity depends on the percentage of the area of the surface defect 59a to the cross section of the light beam on the surface of the optical disc. For example, if the numerical aperture NA is 0.85 and if a light beam spot with a diameter of 0.29 μm is formed on the first information layer L0, the light beam will have a diameter of approximately 140 μm (i.e., 0.14 mm) on the surface of the optical disc.

Comparing FIGS. 4(a) and 4(b) to each other, it can be seen easily that in a situation where the light beam is focused on the information layer L1 that is located closer to the surface of the optical disc, the cross section of the light beam on the surface of the optical disc decreases compared to a situation where the light beam is focused on the more distant information layer L0. That is to say, the diameter of the light beam on the surface of the optical disc changes with the depth of the information layer on which the focal point of the light beam is located. Consequently, the closer to the surface of the optical disc the information layer on which the light beam is now focused, the greater the percentage of the scratch or dust to the cross section of the light beam on the surface of the optical disc.

The results of the experiments the present inventors carried out revealed that in a situation where there was a surface defect 59a on the surface of the optical disc that was too small to find easily with naked eyes, if the focal point of the light beam was set on the information layer L0 that was located more distant from the surface of the optical disc, the influence of a scratch or dust on the decrease in the intensity of the reflected light was negligible. Even so, if the focal point of the light beam was set on the information layer L1 that was located closer to the surface of the optical disc, then the influence of the surface defect 59a on the decrease in the intensity of the reflected light was non-negligible, and errors occurred more easily in reading or writing data from/on the information layer L1.

As can be seen from the foregoing description, the harmful influence of a scratch or dust on the surface of an optical disc will grow if the light beam is focused on an information layer that is located closer to the surface of the optical disc but sometimes may be neglected if the light beam is focused on an information layer that is located more distant from the surface of the optical disc. That is to say, unlike the bubble 11 produced inside an optical disc, the scratch or dust on the surface of the optical disc does not affect every information layer thereof. That is why as far as dust or a scratch is concerned, it is not preferable to regard every perpendicularly projected area on each information layer as a "defective area" and prohibit the access to that area without exception.

It should be noted that there could be some surface defect 59b that is bigger than the cross section of the light beam on the surface of the optical disc as shown in FIGS. 4(a) and 4(b). No matter which information layer the light beam is focused on, when the light beam crosses such an extremely big surface defect 59b, the intensity of the reflected light will decrease so significantly that errors will likely to occur in reading or writing data. However, if there is such a big scratch or dust on the surface of the optical disc, that defect can be easily found even with naked eyes, and therefore, such an optical disc itself can be disposed of as a defective product, too.

Unlike such a scratch or dust, a bubble is produced inside an optical disc. As the surface of an optical disc is warped or raised only gently even with a bubble, it is difficult to locate the bubble with naked eyes, although the bubble has influence on a broad range with a diameter of 1 mm to 1.5 mm. Also, it is not preferable to dispose of such an optical disc, in which the bubble has been detected, as a defective product, because it would eventually increase the manufacturing cost of the optical discs.

A bubble may or may not be produced easily according to the type of the manufacturing process of BDs. Specifically, a BD, of which the light-transmitting layer has been formed by a spin-coating process as described above, tends to have a lot of bubbles. On the other hand, a BD, of which the light-transmitting layer has been formed (as a protective sheet) by a bonding process, tends to have a small number of bubbles. It should be noted that bubbles could still be produced by the latter process, too.

Also, according to a normal spin-coating process, bubbles often get trapped between the substrate and the light-transmitting layer (information layer) of an optical disc, no matter whether the optical disc is a single-layer disc or a multilayer disc. Meanwhile, in a manufacturing process such as the bonding process, bubbles may get trapped in the intermediate layer (light-transmitting layer) between the first and second information layers L0 and L1 or in the light-transmitting layer that covers the surface of the second information layer L1. Even so, the first information layer L0 through an $n^{th}$ information layer (where n is an integer that is equal to or greater than two) will be affected by the bubbles.

Figure 5:
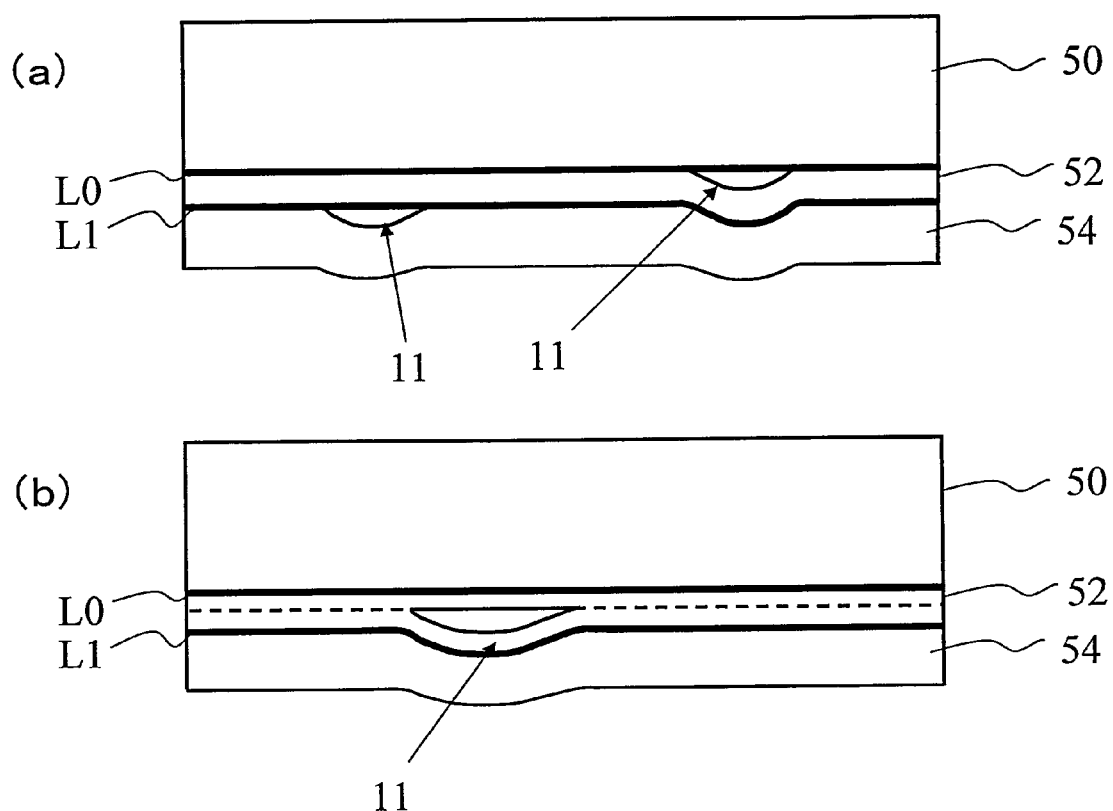
FIGS. 5(a) and 5(b) are schematic cross-sectional views illustrating various locations where bubbles could be produced in a dual-layer disc.

FIG. 5(a) shows a cross section of a dual-layer disc in which bubbles were produced both between the light-transmitting layer 54 and the second information layer L1 and between the light-transmitting layer 52 and the first information layer L0. On the other hand, FIG. 5(b) shows a cross section of a dual-layer disc in which a bubble was produced inside the light-transmitting layer 54. As can be seen easily from FIGS. 5(a) and 5(b), the surface of the optical disc is gently warped and raised, no matter how deep the bubbles were produced. That is why when the light beam crosses such a surface of the optical disc that was warped by the bubbles, the tracking signal always comes to have a pseudo-component irrespective of the depth of the information layer on which the light beam is focused.

FIGS. 6(a) through 6(d) are cross-sectional views illustrating an exemplary manufacturing process to make a dual-layer disc. In this example, after a first information layer L0 has been formed on the surface of an optical disc substrate 50, a light-transmitting layer 52b is formed thereon by a spin-coating process, for example, as shown in FIG. 6(a). In the meantime, another light-transmitting layer 52a is formed on a stamper 58.

Next, as shown in FIG. 6(b), by turning the stamper 58, the light-transmitting layer 52a is brought into contact with the light-transmitting layer 52b on the optical disc substrate 50, and these two light-transmitting layers 52a and 52b are cured and bonded together in that state. After a light-transmitting layer 52 has been formed in this manner by combining the two light-transmitting layers 52a and 52b together, the stamper 58 is removed as shown in FIG. 6(c). Subsequently, a second information layer L1 is formed on the surface of the light-transmitting layer 52 and then another light-transmitting layer 54 is formed on the second information layer L1 by a spin-coating process, for example.

Although not shown in FIGS. 6(a) through 6(d), bubbles may be produced during the manufacturing process. The bubbles may be produced between the light-transmitting layer 52b and the first information layer L0 shown in FIG. 6(a) or between the light-transmitting layers 52a and 52b shown in FIG. 6(b). That is to say, FIG. 5(b) shows the situation where bubbles were produced between the two light-transmitting layers 52a and 52b.

In this manner, the bubbles 11 may be produced at various depths. However, as described above, the bubbles would always affect every information layer, irrespective of the depth of the bubbles.

Hereinafter, specific influences of the bubbles will be described with reference to FIG. 1 again.

Portion (b) of FIG. 1 shows a relation between a bubble 11 on the BD 10 and tracks. In the example illustrated in portion (b) of FIG. 1, the bubble 11 is present over the track 12b and other tracks (including the track 12c) that are located closer to the outer edge than the track 12b is, among the tracks 12a through 12c. On each of these tracks, data is stored on the basis of a data unit called "ECC block" (or "cluster"). When converted into sectors (each having a size of 2 kilobytes), which are the smallest data unit on an optical disc, one cluster is equal to 32 sectors on a BD. Portions 11a and 11b of the bubble 11 are present at the storage locations of clusters 13a and 13b, respectively.

A BD has a track pitch of 0.32 μm. Thus, supposing a single bubble (core) has a size of approximately 100 μm, at most about 300 (=100/0.32) tracks would be affected by a single bubble. On top of that, as an area surrounding the bubble is usually affected, the influence of a bubble could reach a range that typically has a size of about 200 μm (corresponding to approximately 600 tracks).

Data is supposed to be read or written using a cluster as the smallest unit. If there were a bubble on the boundary between clusters, no data could be read or written from/on a number of clusters. Furthermore, under the influence of the bubble, no data can be read or written in many cases from/on clusters surrounding the bubble, either.

If there were only one bubble per turn of a BD, the entire cluster could not be accessed in some cases. For example, only two clusters could be arranged on the innermost portion of the disc. That is why if an access to a certain cluster failed, then the entire track, including the cluster, could not be accessed anymore. As described above, the number of clusters included in those hundreds of tracks could reach as many as several thousand. Consequently, an area with the core of a bubble and its surrounding area become large-scale defect areas.

In addition, under the influence of a bubble, the servo control could lose stability over a length of approximately 1 mm at most in the tracking direction, which is also a problem. The BD standards just specify "the diameter of a bubble should be less than 100 μm", and do not pay attention to the fact that a servo failure and other instabilities would be caused by a raised portion surrounding the bubble.

In such an area where the servo control loses its stability, a write retry operation (i.e., recovery processing) is performed so frequently due to tracking failures or track jumps that a delay that is much longer than a normal one would be caused just by trying to reach a target location. If such a situation persisted for a range of approximately 200 µm (corresponding to about 600 tracks) or more, then data being recorded might be partially missing or it might take a lot more time to get dubbing done. That is why considering that the recorder is required to get recording done in real time and with sufficient accuracy, data should be read or written with such a bubble area avoided.

Patent Document No. 2 mentioned above suggests an alternative writing method in which in a situation where a write error has occurred, an area that has a fixed size as measured from the location where the write error has occurred is regarded as a non-recordable area and in which the write operation is resumed from a location that is a predetermined distance away from the write error location.

However, such a writing method cannot handle the large-scale defective area caused by a bubble. For example, if the bubble area were relatively small, then the beginning of the recordable area would be far ahead of the location that is the predetermined distance away from the write error location. Consequently, that area could not be used effectively even though it is actually a recordable area.

Furthermore, if such a large-scale defective area caused by a bubble were accessed by any chance, then the light beam spot would jump from the track on which data should be written and might eventually destroy the data on the adjacent track.

Figure 7:
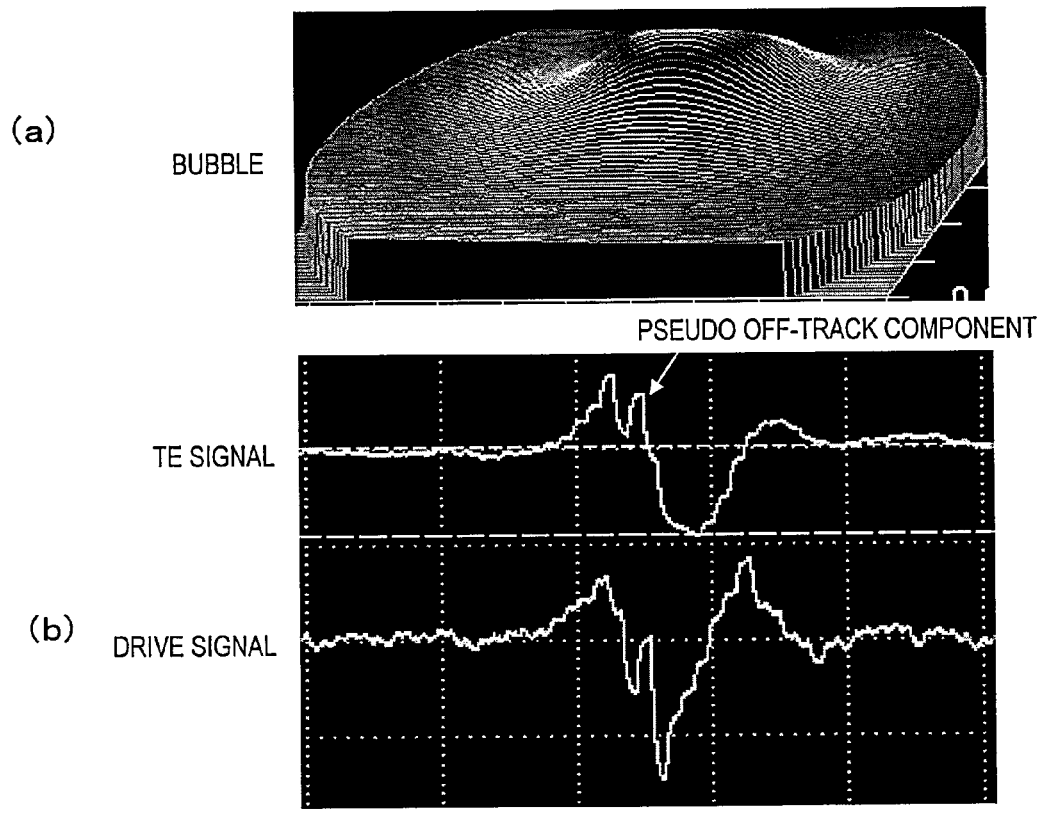
FIG. 7(a) illustrates the unevenness formed on the surface of an optical disc by a bubble.
FIG. 7(b) shows the respective waveforms of a TE signal and a drive signal to be monitored when a light beam crosses the bubble.

FIG. 7($a$) illustrates the unevenness formed on the surface of an optical disc due to the presence of a bubble, while FIG. 7($b$) shows the respective waveforms of a TE signal and a drive signal to be monitored when a light beam passes the bubble. While the light beam is following the centerline of the tracks, the amplitude of the TE signal is at zero level. However, as the light beam shifts from the centerline of the tracks in the disc radial direction, the TE signal comes to have non-zero amplitude components. In that case, to cancel the shift (which is so-called "off-track") of the light beam from the centerline of the tracks, the position of the objective lens in the optical pickup is adjusted in the disc radial direction. The position of the objective lens in the disc radial direction is adjusted by a lens actuator in the optical pickup. The drive signal shown in FIG. 7($b$) shows the waveform of drive current supplied to the lens actuator.

As shown in FIG. 7($b$), when the light beam crosses the bubble on the BD, the waveform of the TE signal comes to have a component representing a pseudo off-track phenomenon. Such a waveform component is produced due to the presence of a bubble even if the light beam does follow the centerline of the tracks. That is why such a component will be referred to herein as a "pseudo off-track component" of a TE signal. If such a pseudo off-track component were produced in the TE signal, the tracking control would be carried out in response to the pseudo off-track component and the light beam spot would come off the target track, which is a problem called "abnormal track jump".

FIG. 7($b$) shows an example in which the waveform of the TE signal is varied by a bubble that has been produced in a single-layer disc with just one information layer. On the other hand, FIG. 29 shows that if there is a bubble in a dual-layer disc, that bubble varies the waveforms of the TE signals generated from both of the two information layers (Layers 0 and 1) thereof. In this example, it is not clear which of the two information layers is located closer to the bubble. Nevertheless, it can still be seen that in both of the two information layers, the waveforms of the TE signals are deformed due to the bubble at the positions under the same two-dimensional location on the surface of the optical disc (i.e., the same radial location and the location defined by the same angle).

Figure 8:
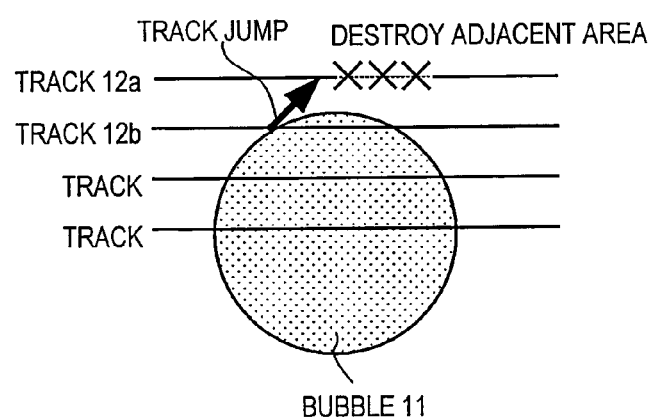
FIG. 8 schematically illustrates an abnormal track jump.

FIG. 8 schematically illustrates an abnormal track jump. That is to say, FIG. 8 shows that while data is being written on a track 12$b$, the light beam spot happens to jump to an adjacent track 12$a$ due to the presence of a bubble 11. In that case, the write processing will be continued on the wrong track 12$a$, thus destroying the existent data there by mistake, which is a huge problem. For example, if AV data has been destroyed, the playback will temporarily come to a halt. On the other hand, if management information that is indispensable for playback has been destroyed, then a recorded content could not be played back anymore. Or in a worst-case scenario, no data could be readable at all from that optical disc.

Figure 9:
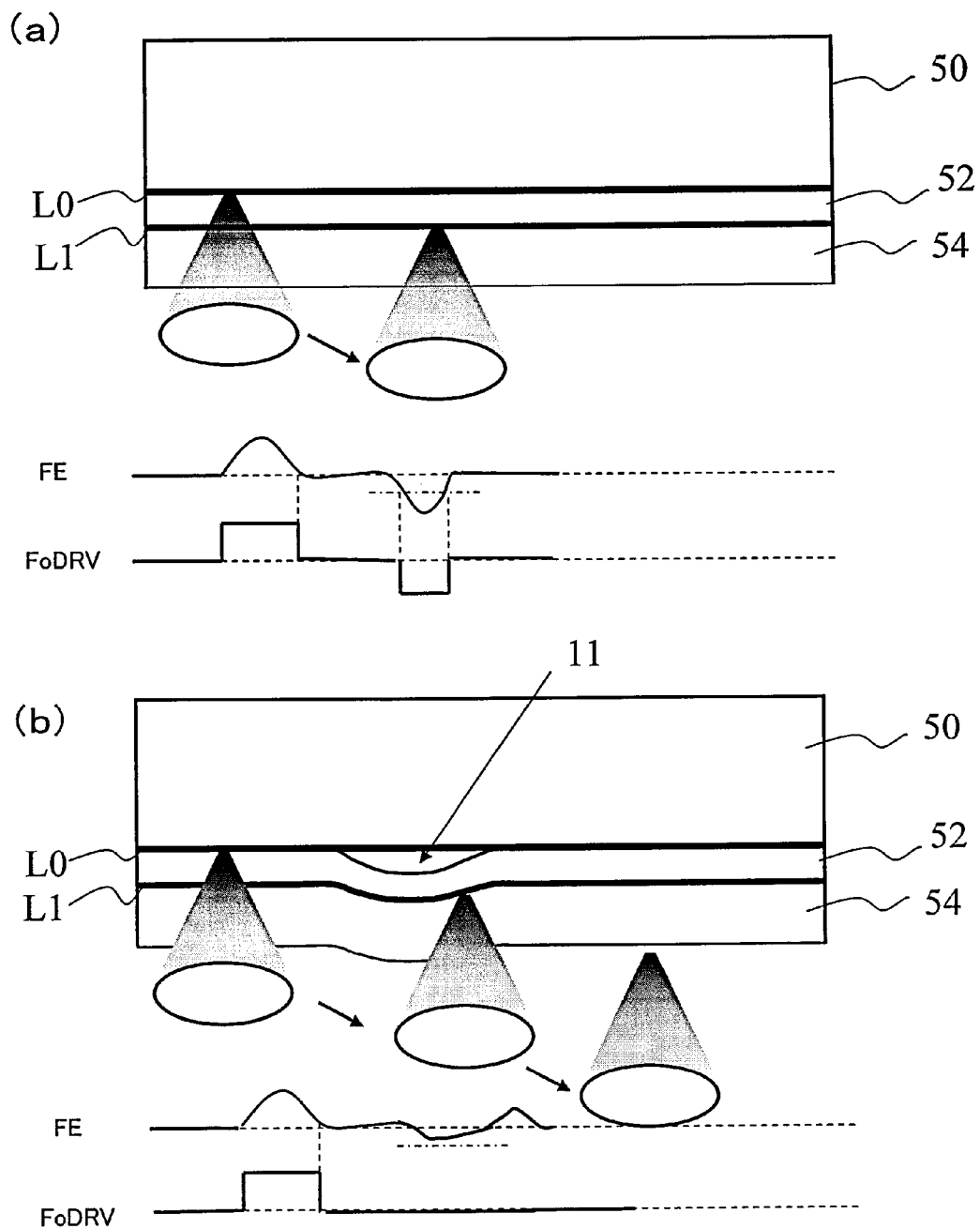
FIGS. 9(a) and 9(b) are schematic representations and waveform diagrams illustrating how a layer-to-layer jump is made in a dual-layer disc.

FIG. 9($a$) shows a relation between the position of a light beam and a focus error signal in a situation where the light beam does not pass through any bubble area while the focal point of the light beam is shifting from the first information layer L0 to the second information layer L1. On the other hand, FIG. 9($b$) shows a relation between the position of a light beam and a focus error signal in a situation where the light beam passes through a bubble area while the focal point of the light beam is shifting from the first information layer L0 to the second information layer L1.

As shown in FIG. 9($a$), as normally there are no bubbles, adjustments are made such that the shift of the focus to the next layer is completed by applying a predetermined accelerating or decelerating pulse FoDRV. However, if not the origination but the destination is a bubble area, the layer-to-layer distance is not constant and the focus may be unable to reach the next layer as shown in FIG. 6($b$) because the optical disc is rotating. Alternatively, if not the destination but the origination is a bubble area, then the focus may go beyond the next layer. In either case, the focus may not be able to shift between the layers constantly.

According to the present invention, by taking advantage of the fact that a bubble will affect a plurality of information layers at the same time, a single information layer is searched for a bubble, thereby locating and managing a large-scale defective area caused by a bubble in a multilayer disc without searching the other information layers for any bubble.

Thus, according to the present invention, only a specified reference layer needs to be searched for a defect. Consequently, the defect search time can be n times (where n is the number of layers stacked) as short as the one in a situation where every information layer of a multilayer disc should be searched for a defect.

It should be noted that when the optical disc is loaded, the reference layer should be searched for a defect albeit for just a short period of time. However, if the reference layer of an optical disc yet to be shipped is searched for a defect and if the result is recorded on the optical disc, then the user who has purchased the optical disc does not have to spend his or her time in searching the disc for any defect all over again.

According to the present invention, a large-scale defect that has been detected in the reference layer is regarded as a bubble defect. However, even if the defect is actually not a bubble defect, that will not be a big problem. This is because by regarding the large-scale defect detected in the reference layer as a bubble defect and by regarding an area of another information layer affected by the bubble defect as a bubble defect area, too, significant advantages will be achieved for the following reasons:

1) The data transfer rates of current telecasts are about 20 Mbps. For example, in writing broadcast data (as a content) on an optical disc such as a BD at a rate of 72 Mbps, if the servo control failed and retry processing should be performed due to the presence of a defect on the optical disc, then the broadcast data could not be written in real time anymore.

Likewise, even if a defect was detected on the optical disc and registered while the broadcast data is being written, the broadcast data could no longer be written in real time, either.

2) If a digital content that is stored on a hard disk drive is dubbed to an optical disc, that content will be erased from the hard disk drive to meet the copy-once restriction. That is why even if it turns out, after the content has been dubbed to the optical disc, that part of the content has been recorded in a defective area, the content can no longer be transferred from the hard disk to a non-defective area of the optical disc all over again. And if the content stored in such a defective area is played back, block noise or freeze may occur under the influence of the defect.

That is why by determining the large-scale defect detected in the reference layer to be a bubble area and by regarding its projected area in any other information layer as a data writing prohibited area automatically, the data can be written both quickly and accurately. Consequently, the present invention will achieve particularly significant effects in recording a digital broadcast on an optical disc, among other things.

(Embodiment 1)

Hereinafter, a First Specific Preferred Embodiment of an optical disc apparatus according to the present invention will be described with reference to the accompanying drawings.

The physical and logical structures of an optical disc and a method for managing its areas will be described first. After that, the configuration and operation of an optical disc apparatus as a first preferred embodiment of the present invention will be described.

Portion (a) of FIG. 10 illustrates the physical structure of a multilayer disc 1. On the disklike multilayer disc 1, arranged spirally are a number of tracks 2, each of which is further subdivided into a great many logical sectors 3.

Portion (b) of FIG. 10 illustrates the logical structure of the multilayer disc 1. The area on the multilayer disc 1 is roughly divided into a lead-in area 4, a data area 5 and a lead-out area 6. Data is supposed to be read and written from/on the data area 5. The data area 5 includes a user data area 16 on which user data is written mostly. The user data area 16 in the data area 5 is preceded and followed by a pair of spare areas to be described later. If there is any defective sector in the user data area 16, one of the spare areas will be used as an alternative area to store the data that should have been written on that defective sector.

The lead-in area 4 and the lead-out area 6 function as margins that allow the optical head of an optical pickup (not shown) to get back on tracks even if the optical head has overrun while the optical pickup is accessing an end portion of the data area 5. That is to say, these areas 4 and 6 function as "rims" so to speak. The lead-in area 4 also includes an optical disc information area in which various parameters that are needed in accessing the optical disc are stored. Each sector 3 is given a physical sector number (PSN) to identify that sector 3 from the others. In addition, a sector 3 in the data area 5 is also given a logical sector number (LSN) that is a serial number starting at zero so as to allow a high-order device (not shown) such as a host computer to recognize that sector.

FIG. 11 is a cross-sectional view illustrating the physical structure of the multilayer disc 1 with two information layers that are stacked one upon the other. The information layers 33 and 34 are formed by cutting grooves on transparent substrates 31 and 32 in the shape of spiral tracks and by depositing the material of the information layers 33 and 34 on the grooves. It should be noted that the illustration of the grooves is omitted from FIGS. 3 to 5 for the sake of simplicity.

Next, the gap between the two information layers 33 and 34 is filled with a transparent light curable resin 35 and then the two substrates 31 and 32 are bonded together, thereby forming a multilayer disc 1. Dual-layer discs are defined differently between BDs and DVDs. In this example, following the definition of a BD as an optical disc, the information layer 33 that is located more distant from the incoming laser beam 38 will be referred to herein as a first information layer Layer 0 (which will be abbreviated herein as "L0") and the information layer 34 that is located closer to the incoming laser beam 38 will be referred to herein as a second information layer Layer 1 (which will be abbreviated herein as "L1"). In a BD, the layer-to-layer distance between L0 and L1 is 25 µm. When an objective lens with a high NA is used, a collimator lens 39, which is a concave lens, is arranged on the optical axis and moved along the axis, thereby adjusting the spherical aberration. Meanwhile, an objective lens 37 is driven in the focus direction, thereby shifting the converged light beam spot (or focal point) and converging the light beam on either the first information layer 33 or the second information layer 34.

Figure 12:
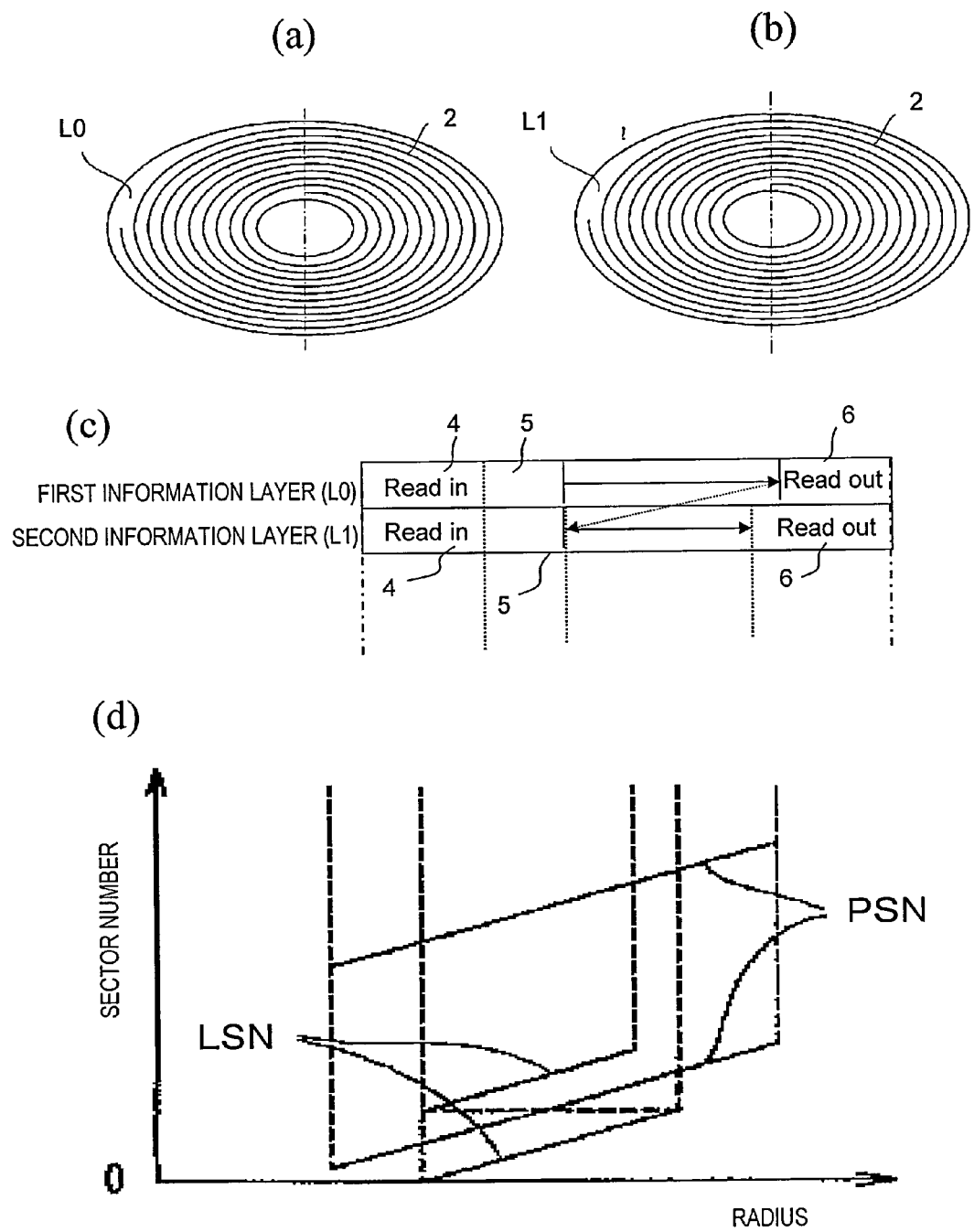

FIG. 12 shows the tracks on two information layers L0 and L1, which are called "parallel paths", the scanning directions and the sector numbers thereof. Specifically, FIG. 12(a) illustrates the spiral groove pattern of the first information layer L0. FIG. 12(b) illustrates the spiral groove pattern of the second information layer L1. FIG. 12(c) shows the scanning directions of the user data areas 16 that are arranged on the information layers L0 and L1. And FIG. 12(d) shows the sector numbers that are assigned to the information layers L0 and L1.

If the disc is rotated clockwise as viewed from under the patterns shown in FIGS. 12(a) and 12(b), the laser beam will go from an inner portion of the first and second information layers L0 and L1 toward an outer portion thereof along the tracks 2.

If the light beam goes in the read/write directions shown in FIG. 12(c), the light beam starts at the innermost location of the data area 5 on the first information layer L0, reaches the outermost location thereof, and then goes from the innermost location of the data area 5 of the second information layer L1 toward the outermost location thereof. The data areas 5 of the first and second information layers L0 and L1 are each sandwiched between the lead-in and lead-out areas 4 and 6 such that the light beam can get back on tracks 2 even if the optical head has overrun.

As shown in FIG. 12(d), the PSNs and LSNs are assigned to the respective information layers L0 and L1 so as to increase in the read/write directions. To make the optical disc more easily, the PSNs do not have to start with zero and do not have to be continuous between the first and second information layers L0 and L1, either. Optionally, a value with a layer number that matches the high-order digit of the sector number may be used as a PSN. As LSNs, a series of numbers that start with zero are assigned to the entire data areas 5 of the optical disc. Specifically, in the user data area 5 on the first information layer L0, the LSN is zero at the innermost location but the LSNs increase one by one toward the outer edge. On the other hand, in the data area 5 on the second information layer L1, the LSN at the innermost location is the maximum LSN of the first information layer L0 plus one and then the LSNs increase one by one toward the outer edge.

Figure 13:
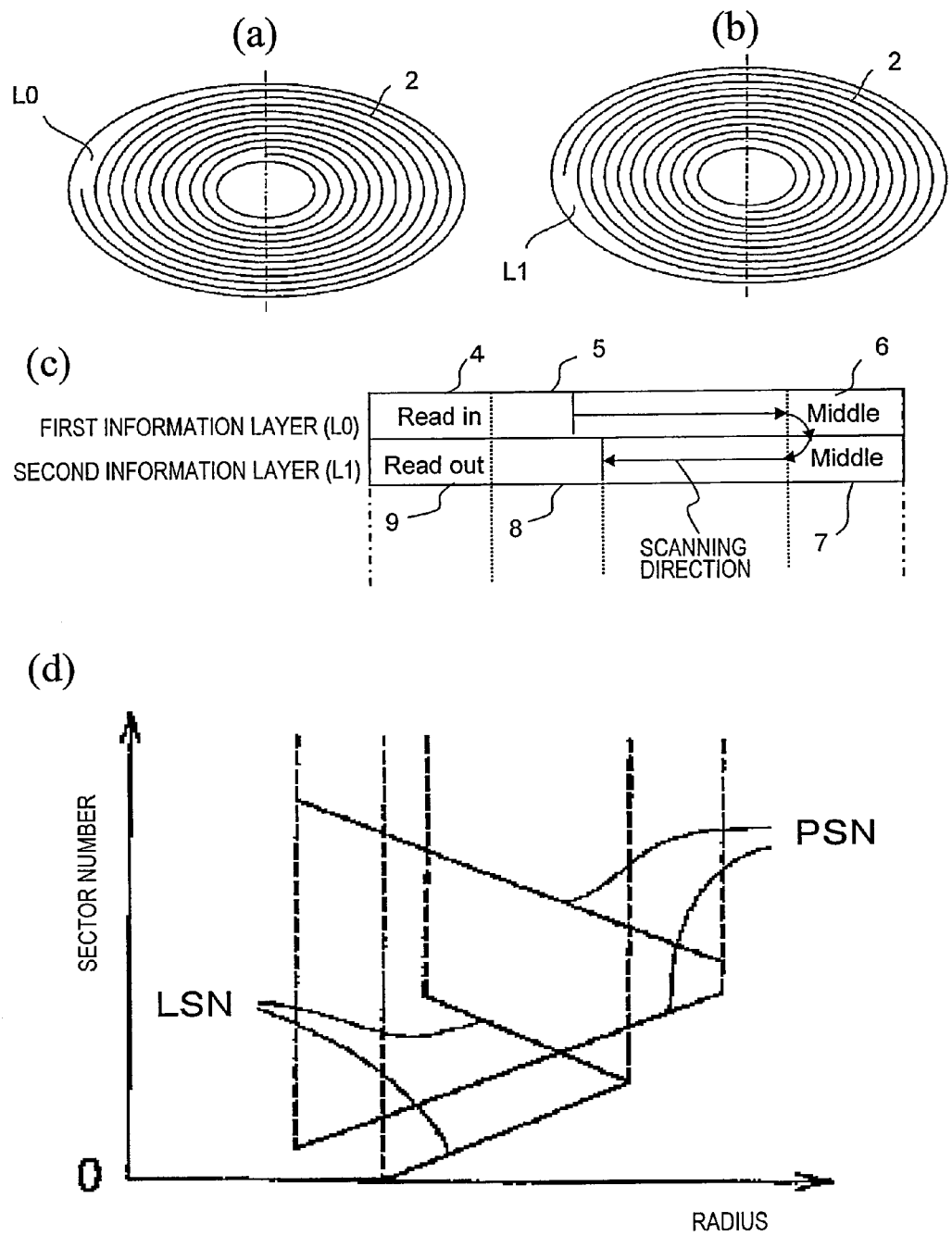

FIG. 13 shows the tracks on two information layers L0 and L1, which are called "opposite paths", the scanning directions and the sector numbers thereof. Specifically, FIG. 13(a) illustrates the spiral groove pattern of the first information layer L0. FIG. 13(b) illustrates the spiral groove pattern of the second information layer L1. FIG. 13(c) shows the read/write directions of the data areas 5 and 8 that are arranged on the information layers L0 and L1. And FIG. 13(*d*) shows the sector numbers that are assigned to the information layers L0 and L1.

If the disc is rotated clockwise as viewed from under the patterns shown in FIGS. 13(*a*) and 13(*b*), the laser beam will go from an inner portion toward an outer portion along the tracks 2 on the first information layer L0. On the other hand, on the second information layer L1, the laser beam will go from an outer portion toward an inner portion. If the light beam goes in the read/write directions shown in FIG. 13(*c*), the light beam starts at the innermost location of the data area 5 on the first information layer L0, reaches the outermost location thereof, and then goes from the outermost location of the data area 8 of the second information layer L1 toward the innermost location thereof. The data area 5 of the first information layer L0 is sandwiched between the lead-in area 4 and a middle area 6 and the data area 8 of the second information layer L1 is sandwiched between a middle area 7 and the lead-out area 9 such that the light beam can get back on tracks 2 even if the optical head has overrun. The function of the middle area 7 is the same as that of the middle area 6.

As shown in FIG. 13(*d*), the PSNs and LSNs are assigned to the respective information layers L0 and L1 so as to increase in the read/write directions as in the parallel paths described above. However, since the spiral tracks 2 on the second information layer L1 are opposite to the ones on the first information layer L0, the relation between the sector numbers and the radial direction is different from that of the parallel paths. Specifically, in the data area 5 on the first information layer L0, the LSN is zero at the innermost location but the LSNs increase one by one toward the outer edge. On the other hand, in the data area 8 on the second information layer L1, the LSN at the outermost location is the maximum LSN of the data area 5 on the first information layer L0 plus one and then the LSNs increase one by one toward the inner edge.

FIG. 14 shows a detailed data structure of the dual-layer disc 1 with the opposite paths shown in FIG. 13. As shown in FIG. 14, the lead-in area 4 of the first information layer L0 includes a first defect management area (DMA1) 30*a*, a second defect management area (DMA2) 31*a*, and a group of temporary optical disc management areas 20. DMA1 and DMA2 are areas for managing information about defective blocks in the data area 5 and other pieces of information.

In the dual-layer disc with the parallel paths shown in FIG. 12, the data structures of the two information layers thereof are extremely similar to each other physically. Specifically, in the parallel path arrangement, two independent lead-out areas are arranged at respective locations corresponding to the middle areas 6 and 7 of the first and second information layers shown in FIG. 14. In the parallel path arrangement, however, the lead-in area of the second information layer is actually arranged at the location of the lead-out area 9 on the innermost portion of the second information layer L1. Meanwhile, the defect management areas, temporary optical disc management areas and extra defect management areas are arranged at the same physical locations as the ones shown in FIG. 14.

The data area 5 is an area to store data and includes a user data area 16*a* and spare areas 17*a*. On the user data area 16*a*, the user may store any arbitrary type of information including real time data such as music or video and computer data such as sentences or database. The spare areas 17*a* are alternative areas for the data area 5. For example, if any defective block has been detected in the user data area 16*a*, the data that should have been written on the defective block may be written on one of the spare areas 17*a* instead.

In the data structure for a multilayer disc shown in FIG. 14, one spare area 17*a* is arranged on the innermost portion of the data area 5 (i.e., closest to the lead-in area) and another spare area 17*b* is arranged on the outermost portion of the data area 5 (i.e., closest to the middle area). However, the number and arrangement of the spare areas 17*a* may be determined arbitrarily and are never limited to the illustrated ones.

The middle area 6 includes a third defect management area (DMA3) 32*a* and a fourth defect management area (DMA4) 33*a*. DMA3 and DMA4 are areas for managing information about defective blocks in the data area 5 and other pieces of information.

Each of DMA1 through DMA4 is an area to be arranged at a predetermined location and its size is a fixed length. However, the size of the management information stored in each of DMA1 through DMA4 has a length that varies according to the number of defective blocks, for example.

The group of temporary optical disc management areas 20 includes a number N (which is an integer that is equal to or greater than one) of temporary optical disc management areas 21*a*. Each temporary optical disc management area 21*a* is an area to temporarily store updated management information, and stores sequential recording range information, information about temporary optical disc definition structure and other pieces of information.

The N temporary optical disc management areas 21*a* are updated every time any data is written on the multilayer disc 1. And the last temporary optical disc management area #N comes to have currently the latest piece of management information on the multilayer disc 1. In a write-once medium such as a BD-R, the management information cannot be rewritten, and therefore, information has to be just added to retain the latest piece of management information. That is why information is accumulated on the temporary optical disc management areas 21*a*. Information is sequentially written on these N temporary optical disc management areas 21*a* from the beginning toward the end of the group of temporary optical disc management areas 20 (i.e., from an inner portion of the multilayer disc 1 toward the outer edge thereof).

The group of temporary optical disc management areas 20, including the temporary optical disc management areas 21*a*, does not always have to be included in the lead-in area 4 but may also be located anywhere else but the user data area 16*a*, e.g., in the lead-out area 9 or in the spare areas 17*a*.

Next, the format of Layer 1 as the second information layer will be described.

The lead-out area 9 of Layer 1 includes a first extra defect management area (EXDL1) 30*b*, a second extra defect management area (EXDL2) 31*b* and a group of temporary optical disc management areas 20. EXDL1 and EXDL2 are areas for managing information about defective blocks in the data area 8 and other pieces of information.

Just like the data area 5 of Layer 0, the data area 8 is an area to store data and includes a user data area 16*b* and spare areas 17*b*. On the user data area 16*b*, the user may store any arbitrary type of information including real time data such as music or video and computer data such as sentences or database. The spare areas 17*b* are alternative areas for the data area 8. For example, if any defective block has been detected in the user data area 16*b*, the data that should have been written on the defective block may be written on one of the spare areas 17*b* instead.

In the data structure for a multilayer disc shown in FIG. 14, one spare area 17*b* is arranged on the innermost portion of the data area 8 (i.e., closest to the lead-out area) and another spare area 17b is arranged on the outermost portion of the data area 8 (i.e., closest to the middle area) on the second information layer L1. However, the number and arrangement of the spare areas 17b may be determined arbitrarily and are never limited to the illustrated ones.

The middle area 7 includes a third extra defect management area (EXDL3) 32b and a fourth extra defect management area (EXDL4) 33b. EXDL3 and EXDL4 are areas for managing information about defective blocks in the data area 8 and other pieces of information.

In a write-once medium such as a BD-R, the management information may not be rewritten. That is why a dual-layer medium with an increased storage capacity needs a bigger management area. In Layer 1, the group of temporary optical disc management areas 20 may also be relocated as in Layer 0.

The DMA1, DMA2, DMA3 and DMA4 areas 30a, 31a, 32a and 33a that are arranged in Layer 0 as the reference layer store the same piece of defect management information. This is done in order to maintain the reliability of the defect management information sufficiently high by storing the same piece of defect management information in multiple areas on the inner and outer portions of a multilayer optical disc. In this preferred embodiment, the defective areas are defective sectors.

Also, the EXDL1 area 30b arranged on Layer 1 could be used as a replacement if information could not be written properly on the DMA1 area 30a of Layer 0 due to some deterioration, for example. Likewise, the EXDL2 area 31b could be used as a replacement if information could not be written properly on the DMA2 area 31a of Layer 0 due to some deterioration, for example.

In this case, if a bubble formed a defective area A 530 in the user data area 16a of the first information layer L0 as shown in FIG. 14, then another defective area B 531 will be present at the same two-dimensional location of the user data area 16b of the second information layer L1 owing to the property of bubbles described above. If the defective area A 530 can be detected based on the relation between the optical disc structures shown in FIGS. 12 and 13 and the PSN, then the defective area B 531 can also be located by itself. Conversely, if the defective area B 531 can be detected, then the defective area A 530 can also be detected automatically.

Consequently, no matter on which information layer any of those defective areas caused by a bubble has been detected, the two-dimensional location (PSN) of the bubble on every information layer is calculated and then added to the record, along with its size, in either DMA1 through DMA4 or EXDL1 through EXDL4 in a predetermined format. The method and processing of recording that location will be described later.

Hereinafter, an optical disc apparatus as a first specific preferred embodiment of the present invention will be described. In this preferred embodiment, the optical disc apparatus is supposed to be a BD recorder that can be read and write data from/on a BD-R that allows recording only once. That is why in the following example, the multilayer disc 1 will be referred to herein as the BD 1.

FIG. 15 illustrates an arrangement of functional blocks for the BD recorder 100.

Hereinafter, the operation of the BD recorder 100 will be outlined briefly. Specifically, before writing data on an optical disc (which is typically a BD), the BD recorder 100 searches the storage area for any defective area. And on detecting a servo error by a servo signal that has been generated based on the light reflected from the optical disc, the recorder 100 determines a portion of the storage area where that error has occurred as a defective area and measures the size of that defective area. And by finding the location, size and other parameters of the defective area, the recorder 100 manages the storage area based on those parameters such that no data will be written on that defective area.

The BD recorder 100 detects a defective area before writing data on an optical disc, and therefore, can write data there while avoiding the defective area. That is why the recorder 100 will be able to write data smoothly after that. As a result, a BD recorder 100 that has high real-time write performance can be provided. For example, in recording a telecast using the BD recorder 100, the probability of recording failure can be reduced to a very low level.

On top of that, the recorder 100 measures the size of the defective area and then manages the storage area such that no data will be written on that defective area. That is why there is no need to secure necessary storage area while avoiding the defective areas excessively. Consequently, the storage area of the optical disc can be used more fully.

Hereinafter, the configuration of the BD recorder 100 will be described. The BD recorder 100 includes an optical disc drive 102, a high-order controller 104 and an input/output (I/O) bus 170 to which the optical disc drive 102 and the high-order controller 104 are connected.

The high-order controller 104 may be a main CPU for the BD recorder 100, for example. The main CPU executes a computer program that has been loaded into a memory (not shown), thereby performing computation processing. And based on the results of the computation processing, the main CPU gives an instruction to the optical disc drive 102 and other components of the BD recorder 100. The instruction is transferred to the respective components by way of the I/O bus 170. In accordance with that instruction, the respective components perform their operations, thereby achieving various functions of the BD recorder 100.

Hereinafter, the functions of the high-order controller 104 will be described in detail first. After that, the optical disc drive 102 that performs predetermined operations in accordance with the instruction given by the high-order controller 104 will be described.

The high-order controller 104 includes an instruction issuing section 106 and a buffer 108. The instruction issuing section 106 issues multiple types of instructions to the optical disc drive 102.

Specifically, examples of those instructions include a sequential recording range control instruction, an optical disc surface check instruction, a check result return instruction, a write instruction and a read instruction. On receiving responses to these instructions from the optical disc drive 102, the instruction issuing section 106 stores the responses in the buffer 108.

The sequential recording range control instruction is a generic term that collectively refers to multiple types of commands that are issued to perform a control on the sequential recording range (SRR). Examples of those commands include a sequential recording range information (SRRI) acquire command, an SRR reserve command and an SRR close command.

The instruction issuing section 106 stores the sequential recording range information, which has been acquired from the optical disc drive 102 in accordance with the SRRI acquire command, in the buffer 108. Also, before issuing a write instruction to be described later, the instruction issuing section 106 issues an SRR reserve command to the optical disc drive 102, thereby reserving an SRR in the user data area 6 of the BD 1. In addition, the instruction issuing section 106 also issues a close command with respect to the SRR reserved, thereby making that SRR write-disabled.

The optical disc surface check instruction is issued to instruct the optical disc drive 102 to detect a surface defect, if any, on the BD 1. As used herein, the "surface defect" includes not only a scratch that was left on the surface of the multilayer disc 1 but also a large-scale defect caused by the raised surface due to the presence of a bubble as shown in FIG. 2. The instruction issuing section 106 issues an optical disc surface check instruction, including a check start position and check range specified, to the optical disc drive 102. In accordance with the optical disc surface check instruction, the optical disc drive 102 checks the BD 1, thereby drawing up a list of defect information.

The check result return instruction is issued to instruct the optical disc drive 102 to return the result of the surface check that has been done on the surface of the BD 1 in accordance with the optical disc surface check instruction. In response to the check result return instruction, the optical disc drive 102 returns the list of defect information. Then, the instruction issuing section 106 stores the list of defect information, which has been returned from the optical disc drive 102, in the buffer 108.

The write instruction is issued to get the data to be written, (which will be referred to herein as "write data" and) which is stored in the buffer 108, written on the BD 1. The write instruction is also called an "AV write command". The instruction issuing section 106 issues the write instruction to the optical disc drive 102 and then sends the write data to the optical disc drive 102.

The read instruction is issued to instruct the optical disc drive 102 to read data from the BD 1. The instruction issuing section 106 receives the data that has been read by the optical disc drive 102 (which will be referred to herein as "read data") and stores it in the buffer 108.

Hereinafter, the optical disc drive 102 will be described.

The optical disc drive 102 includes an instruction processing section 110, a writing control section 120, a reading control section 130, a recording range control section 140, a surface checking section 150 and a data buffer 160.

The instruction processing section 110 interprets the instruction that has been given by the instruction issuing section 106 of the high-order controller 104 and conveys the instruction to the other components. In the following description, the instruction is supposed to be sent from the instruction issuing section 106 to the components other than the instruction processing section 110. However, this is just for convenience sake. Actually, the instruction processing section 110 performs the processing described above and the instruction is conveyed to the other components as a result.

In accordance with the write instruction received, the writing control section 120 controls writing of data on the BD 1. Meanwhile, the reading control section 130 controls reading of data from the BD 1 in response to the read instruction.

In response to the sequential recording range control instruction received, the recording range control section 140 controls the sequential recording range on the BD 1. As used herein, the "control" refers to various types of processing including acquiring the sequential recording range information SRRI, reserving the SRR, and closing the SRR.

Particularly, if the list of defect information is generated by a defect size measuring section 153 to be described later, the recording range control section 140 manages the storage area such that no data will be written on an area of the reference layer that is specified by the defect information list (e.g., a large-scale defective area caused by a bubble) or on a perpendicularly projected area, which is defined by perpendicularly projecting that area of the reference layer to another information layer. More specifically, the recording range control section 140 records the defective area as the sequential recording range SRR and immediately closes that SRR. As a result, it is understood that continuous data has been reserved or written on that defective area, and no data will be written on that defective area anymore.

The recording range control section 140 includes a range information processing section 141, a control memory 142 and a layer-to-layer jump range control section 143. The range information processing section 141 gets the sequential recording range information SRRI read or written (or updated) from/on the BD 1. The sequential recording range information SRRI is actually written or updated by the writing control section 120 in accordance with the write instruction given by the range information processing section 141. Also, the sequential recording range information SRRI is actually read by the reading control section 130 in accordance with the read instruction given by the range information processing section 141. The control memory 142 retains the sequential recording range information SRRI that either has been read or is going to be written. By reference to the defect information list, the layer-to-layer jump range control section 143 controls the access sequence such that no layer-to-layer jump is made from the area of the reference layer to the perpendicularly projected area on another information layer.

In accordance with the optical disc surface check instruction, the surface checking section 150 detects a defect from the BD 1 and generates a list of defect information.

The surface checking section 150 includes a search section 151, a defect decision section 152, a defect size measuring section 153 and a defect information buffer 154.

The search section 151 searches the reference layer (i.e., Layer 0 that is the first information layer at the deeper level) among the multiple information layers stacked for a defective area while getting a defect, if any, detected by the defect decision section 152 from the reference layer. More specifically, the search section 151 controls the optical pickup (to be described later), thereby adjusting the location of light beam spot such that the light beam spot shifts stepwise by a predetermined distance in the radial direction on the BD 1. And every time the light beam spot is shifted, the search section 151 makes the defect decision section 152 detect a defective area, if any, thereby searching for any defective area. In this preferred embodiment, the search section 151 is supposed to search for a defective area before writing user data on the user data area 16.

On detecting a servo error based on the light detection signal supplied from the optical pickup while the search is being performed, the defect decision section 152 determines the storage area where the error has occurred to be a defective area. For example, every time the light beam spot is shifted by the search section 151, the defect decision section 152 monitors the level of the tracking error (TE) signal over either one track on the BD 1 or even a greater track length, and measures the detection threshold value when the TE signal is disturbed and the point in time when the threshold value is exceeded, thereby determining whether or not there is actually the servo error. This processing will be described in further detail later with reference to FIGS. 16 through 18.

After a servo error has been detected in the reference layer, the defect size measuring section 153 measures the size of the defective area, thereby generating a defect information list indicating that there is a defective area on the reference layer and that there is also a defective area on another information layer, which is defined by perpendicularly projecting the defective area from the reference layer to that another information layer. In the defect information list, information about the beginning of the defective area detected (i.e., the defect start point) and information about its size are stored in association with each other. The defect information buffer 154 stores the defect information list. The data buffer 160 temporarily stores the write data and the read data.

In this preferred embodiment, the defect size measuring section 153 generates in advance the defect information list indicating that there is also a defective area on another information layer, which is defined by perpendicularly projecting the defective area from the reference layer to that another information layer. According to the present invention, if such a servo error has been detected in the reference layer, it is determined that the servo error has been caused by a bubble. Strictly speaking, this preferred embodiment is characterized by regarding that another defective area, which is defined by perpendicularly projecting a defective area, detected in the reference layer, to another information layer as a bubble defect area without examining whether the defect has really been caused by a bubble. That is to say, the area that has been regarded as a bubble defect area in the reference layer actually may not be a defective area caused by a bubble. Nevertheless, since the defective area is detected based on just the servo error described above without making a strict decision about whether the defective area was actually caused by a bubble or not, the disc loading process can be shortened. The number of bubbles that could be included in a single optical disc is one to three at most. That is why even if the defective area caused by a bubble is located as is done in this preferred embodiment, the total amount of data stored in those defective areas accounts for just a small percentage of the overall user data, and therefore, that data is negligible.

Hereinafter, the hardware configuration of the optical disc drive 102 will be described with reference to FIG. 16. The correspondence between the hardware configuration and the functional blocks of the optical disc drive 102 shown in FIG. 15 will also be described. FIG. 16 illustrates an exemplary hardware configuration for the optical disc drive 102 of this preferred embodiment.

The optical disc drive 102 includes an optical disc motor 111, an optical pickup 610, an optical disc controller (ODC) 620, a drive section 625 and a system controller 630. The system controller 630 controls the overall operation of the optical disc drive 102 in accordance with a control program installed.

The optical pickup 610 includes a light source 204, a coupling lens 205, a polarization beam splitter 206, an objective lens 203, a condenser lens 207 and a photodetector 208.

The light source 204 is preferably a semiconductor laser diode, which emits a light beam with a wavelength of 415 nm or less in this preferred embodiment. The light beam emitted from the light source 204 is linearly polarized light, of which the polarization direction can be arbitrarily controlled by turning the light source 204 around the optical axis of the light beam emitted. The coupling lens 205 transforms the light beam that has been emitted from the light source 204 into a parallel beam, which is then incident on the polarization beam splitter 206. The polarization beam splitter 206 has such a property as to reflect linearly polarized light that is polarized in a particular direction but to transmit linearly polarized light that is polarized perpendicularly to that particular direction. The polarization beam splitter 206 of this preferred embodiment is designed so as to reflect the light beam that has been transformed by the coupling lens 205 into the parallel beam toward the objective lens 203.

The light beam that has been polarized toward the objective lens 203 is transmitted through the collimator lens 210 and then incident on the objective lens 203. As already described with reference to FIG. 11, the collimator lens 210 is driven parallel to the optical axis by a stepping motor (not shown), for example, and can have its spherical aberration adjusted adaptively to each of the multiple layers.

The objective lens 203 converges the light beam that has been reflected by the polarization beam splitter 206, thereby forming a light beam spot on the information layer of the BD 1.

The light beam that has been reflected from the BD 1 is transformed by the objective lens 203 of the optical pickup 610 into a parallel light beam, which is then incident on the polarization beam splitter 206. In this case, the light beam has had its polarization direction rotated 90 degrees with respect to the polarization direction of the light beam that was incident on the BD 1. That is why the light beam is transmitted through the polarization beam splitter 206 and then incident on the photodetector 208 as it is by way of the condenser lens 207.

The photodetector 208 receives the light that has passed through the condenser lens 207 and converts the light into an electrical signal (specifically, a current signal). The photodetector 208 shown in FIG. 16 has its photosensitive plane divided into four areas A, B, C and D, each of which outputs an electrical signal representing the intensity of the light received there.

To have the light beam spot follow the target track on the information layer of the BD 1 that is being turned at a predetermined velocity by the optical disc motor 111, a tracking error (TE) signal representing the magnitude of a tracking error and a focus error (FE) signal representing the magnitude of a focus error need to be generated based on the light beam that has been reflected from the BD 1. These signals are generated by the ODC 620.

As for the TE signal, the optical disc drive 102 generates a TE signal by the push-pull method during writing and by the phase difference method during reading, respectively.

The optical disc drive 102 of this preferred embodiment determines, based on the TE signal, whether or not there is a servo error before writing data on the BD 1. That is why the TE signal needs to be generated based on a light detection signal representing the light reflected from an area where no data is stored. For that reason, the TE signal is preferably generated by the push-pull method as is done during writing. Thus, the processing of generating a push-pull TE signal will be described first.

An adder 408 of the ODC 620 outputs a sum signal of the areas B and D of the photodetector 208, while an adder 414 outputs a sum signal of the areas A and C of the photodetector 208. A differential amplifier 410 receives the outputs of these two adders 408 and 414 and outputs a push-pull TE signal representing their difference. A gain switcher 416 adjusts the amplitude of the push-pull TE signal to a predetermined one (gain). An A/D converter 420 converts the output signal of the gain switcher 416 into a digital signal and passes it to a DSP 412.

On the other hand, the phase difference TE signal can be obtained in the following manner. Specifically, the adder 344 may output a sum signal A+D, of which the magnitude corresponds with the sum of the outputs of the areas A and D, while the adder 346 may output a sum signal B+C, of which the magnitude corresponds with the sum of the outputs of the areas B and C, for example. Alternatively, other signals may also be generated if the sums are calculated differently. Comparators 352 and 354 digitize the output signals of the adders 344 and 346, respectively. A phase comparator 356 compares the phases of the output signals of the comparators 352 and 354 to each other.

A differential amplifier 360 receives the output signal of the phase comparator 356 and outputs a phase difference TE signal, which is used to perform a control operation that makes the light beam follow the right track on the BD 1.

A gain switcher 366 adjusts the amplitude of the phase difference TE signal to a predetermined value. An A/D (analog-to-digital) converter 370 converts the phase difference TE signal supplied from the gain switcher 366 into a digital signal.

The FE signal is generated by the differential amplifier 358. The FE signal may be detected by any method—by an astigmatism method, a knife edge method or even a spot sized detection (SSD) method. The circuit configuration may be changed appropriately according to the detection method adopted. A gain switcher 364 adjusts the amplitude of the FE signal to a predetermined value. An A/D converter 368 converts the FE signal supplied from the gain switcher 364 into a digital signal.

A DSP 412 controls the drive section 625 based on the TE and FE signals. A control signal FEPWM for focus control and a control signal TEPWM for tracking control are respectively output from the DSP 412 to the drivers 136 and 138 of the drive section 625.

In accordance with the control signal FEPWM, the driver 136 drives the focus actuator 143, which moves the objective lens 203 substantially perpendicularly to the information layer of the BD 1. On the other hand, in accordance with the control signal TEPWM, the driver 138 drives the tracking actuator 202, which moves the objective lens 203 substantially parallel to the information layer of the BD 1. It should be noted that the drive section 625 further includes a driver (not shown) for driving a transport stage on which the optical pickup 610 is mounted. By driving the transport stage with a voltage applied to the driver, the optical pickup 610 can move to any arbitrary location in the radial direction.

Next, a configuration for reading data will be described.

An adder 372 adds together the respective outputs of the areas A, B, C and D of the photodetector 208, thereby generating an all sum signal (A+B+C+D), which is then input to the HPF 373 of the ODC 620.

The all sum signal has its low frequency component filtered out by the HPF 373, is passed through an equalizer section 374, is binarized by a binarization section 375, is subjected to PLL, error correction, demodulation and other processing by an ECC modulator/demodulator 376 and then is temporarily stored in a buffer 377. The capacity of the buffer 377 has been determined with various playback conditions taken into account.

The data in the buffer 377 is read at the timing of playing back video, for example, and then output as read data to a host computer 104 and an encoder/decoder (not shown) by way of an I/O bus 170. In this manner, video or any other type of data can be played back.

Next, a configuration for writing data will be described.

The write data stored in the buffer 377 is provided with an error correction code by the ECC modulator/demodulator 376 to be encoded data. Subsequently, the encoded data is modulated by the ECC modulator/demodulator 376 to be modulated data, which is then input to a laser driver 378. And the laser driver 378 controls the light source 204 based on the modulated data, thereby modulating the power of the laser beam.

The correspondence between FIGS. 15 and 16 will be described.

The instruction processing section 110 shown in FIG. 15 corresponds to the system controller 630 shown in FIG. 16. Likewise, the functions of the recording range control section 140 and the surface checking section 150 shown in FIG. 15 are also performed as parts of the processing done by the system controller 630.

The function of the writing control section 120 shown in FIG. 15 is also performed by the system controller 630 that receives data to be written and instructs how and where to write it. Also, the writing control section 120 includes the tracking signal generating section for generating the push-pull TE signal shown in FIG. 12 in the ODC 620 (including the adders 408, 414, differential amplifier 410, gain switcher 416 and A/D converter 420) and the focus signal generating section for generating the FE signal (including the adder, differential amplifier 358, gain switcher 364 and A/D converter 368). The writing control section 120 further includes the drive section 625. And the writing control section 120 includes even the ECC modulator/demodulator 376 and the laser driver 378.

The function of the reading control section 130 shown in FIG. 15 is also performed by the system controller 630 that instructs how and where to read data. The reading control section 130 includes the components 372 through 376 shown in FIG. 16. The reading control section 130 also includes the components 354 through 370 for generating a phase difference TE signal and the focus signal generating section for generating an FE signal. The reading control section 130 further includes the drive section 625. The data buffer 160 shown in FIG. 15 corresponds to the buffer 377 shown in FIG. 16.

Hereinafter, it will be described how to make the focal point jump between the layers in a situation where the BD 1 is a dual-layer disc.

If the BD 1 is a dual-layer disc, first, the DSP 412 gets the collimator lens 210 driven by the driver 212 and the stepping motor 211 such that the spherical aberration corresponds with a location of 100 μm when it is converted into a base material thickness. After that, the focus control and the tracking control described above are turned ON, thereby getting learning data about predetermined control gains and offsets. Then, the light beam is shifted to the management area on the inner portion of Layer 0 (and to the one on the outer portion thereof, if necessary), thereby reading the management data. Thereafter, the processing of detecting a defective area, if any, over the entire Layer 0 and the processing of measuring the size of the defective area are carried out. Subsequently, the DSP 412 gets the collimator lens 210 driven by the driver 212 and the stepping motor 211 such that the spherical aberration corresponds with a location of 75 μm when it is converted into a base material thickness and a layer-to-layer jump pulse is applied to the actuator 143 by way of the driver 136, thereby moving the light beam spot from Layer 0 to Layer 1.

Once a focal point is formed on Layer 1, the tracking control is also activated, a predetermined type of learning is performed, and then the light beam is shifted to the management area on the inner portion of Layer 1 (and to the one on the outer portion thereof, if necessary), thereby reading the management data there. According to the present invention, if the result of defect test on Layer 0 is applied, then the location and size of the bubble defect on Layer 1 can be estimated. That is why there is no need to take time to perform the processing of detecting any defective area over the entire Layer 1 or the processing of measuring the size of the defective area all over again. As a result, the disc loading process can get done in a shorter time.

Hereinafter, it will be described how the BD recorder 100 of this preferred embodiment gets its processing done. First of all, the processing of detecting a defective area and the processing of measuring the size of the defective area will be outlined with reference to FIGS. 17 to 19. After that, the processing of defining a defective area on another information layer will be outlined with reference to FIGS. 20 and 21. This is the very processing unique to the BD recorder 100 of this preferred embodiment. In the following example, an area with the core of a bubble and its surrounding area are supposed to be exemplary defective areas.

FIGS. 17(*a*) and 17(*b*) are schematic representations illustrating the concept of the optical disc surface check processing of this preferred embodiment. In this example, the checking start point is supposed to be located on the track a of the BD 1 shown in FIG. 17(*a*) and the check range is supposed to have a breadth of 300 μm as measured from the track a. In this check range, an area with a bubble core and its surrounding area are supposed to be included as indicated by the bubble 11.

The optical disc surface check processing may be carried out after the BD recorder 100 has been loaded with the BD 1 and before data starts to be written on the BD 1.

First, the search section 151 controls the optical pickup 610 such that the track a is irradiated with the light beam. When the optical pickup generates a light detection signal based on the light beam that has been reflected from the BD 1, the adders 408 and 414, differential amplifier 410, gain switcher 416 and A/D converter 420 generate a push-pull TE signal based on the light detection signal.

The defect decision section 152 determines, by the level of the push-pull TE signal that has been generated during the search, whether or not a servo error has occurred.

The servo error may be detected in the following manner, for example. FIG. 18 shows the waveform of a tracking error signal with a servo error. The defect decision section 152 monitors the levels of the TE signal for a period of time that corresponds to slightly over one round of the target track on the BD 1. Then, the defect decision section 152 determines whether or not that TE signal includes a servo error component caused by a track jump. For example, the defect decision section 152 may determine, by the length of the period of time Q it takes for the TE signal, which has once exceeded a predetermined detection threshold value (or threshold level) P (where P>0), to get equal to or smaller than P again, whether or not a servo error has occurred. If the period of time Q is longer than a predetermined value, the defect decision section 152 determines that a servo error has occurred. On the other hand, if the period of time Q is equal to or smaller than the predetermined value, then the defect decision section 152 determines that no servo error has occurred. Alternatively, it can also be determined, by the length of the period of time Q' it takes for the TE signal, which has once gone equal to or smaller than another predetermined detection threshold value (or threshold level) P' (where P'<0), to become equal to or greater than P' again, whether or not a servo error has occurred. It should be noted that the defect decision section 152 does not make a decision on any other factor such as the intensity of the reflected light.

Now take a look at FIG. 17(*a*) again. As no servo error occurs in the push-pull TE signal from the track a, the search section 151 shifts the light beam spot onto the next track b, which is 30 μm away from the track a, thereby determining whether or not a servo error occurs in the push-pull TE signal from the track b. As no servo error occurs, either, in the push-pull TE signal from the track b, the light beam spot is further shifted onto the next track c, which is another 30 μm away from the track b. However, as no servo error occurs again as for the track c, the light beam spot is once again shifted onto the next track d, which is another 30 μm away from the track C.

As there is a bubble 11 on the track d, the defect decision section 152 detects a servo error in the push-pull TE signal from the track d. Once an error has been detected, the defect decision section 152 regards that portion of the storage area where the error has occurred as a defective area. Optionally, a more reliable decision may also be made by reacquiring a push-pull TE signal from the track d.

If a servo error has been detected by the defect decision section 152, the search section 151 controls the optical pickup 610 so as to shift the light beam spot backward by a distance of 20 μm, for example, which is shorter than 30 μm that is the track jump interval. Then, the defect decision section 152 determines whether or not there is a servo error on a track at that location.

FIG. 17(*b*) shows a relation between a track e that is located 20 μm behind the previous track and the bubble 11. There are tracks e and f between the tracks c and d. If a servo error Dd has been detected from the track d, the defect decision section 152 again determines whether or not a servo error occurs on the track e. In the example illustrated in FIG. 17(*b*), as the bubble 11 is also present on the track e, the defect decision section 152 detects a servo error De in the track e, too. As a result, it is determined that the beginning of the bubble 11 should be located between the track c where no servo error has occurred and the track e.

After that, the search section 151 shifts the light beam spot stepwise on a 10 μm basis in the radial direction, i.e., from the track e toward the track d, while the defect decision section 152 determines, on each of those tracks, whether or not a servo error occurs. This shift distance is shorter than 30 μm that is the interval between the tracks a and b and between the tracks b and c, and therefore, the bubble 11 can be examined precisely. In the example illustrated in FIG. 17(*b*), the defect decision section 152 continues to detect servo errors from the track e through the track p.

However, when the search section 151 shifts the light beam spot to the track q, no servo error will be detected anymore. As a result, it is determined that the bubble 11 covers the range that spreads from the track e through the track q at least. When no servo errors are detected anymore, the search section 151 may set the light beam spot shift distance to be 30 μm again and may search the remaining tracks for any servo errors through the end of the check range that has been specified in accordance with the optical disc surface check instruction.

The defect size measuring section 153 calculates the size S of the bubble 11 based on the breadth of the range including those tracks from which servo errors have been detected. More specifically, the defect size measuring section 153 calculates the size S of the bubble by multiplying the interval of 10 μm between each pair of tracks searched by the number of those tracks searched that fall within the range starting with the beginning of the bubble 11 and ending with the track p where an error has been detected for the last time. The bubble size S thus obtained has been calculated as representing the range from the track e through the previous track for the track q where no servo error has occurred.

FIG. 19 shows the time series of the respective servo error detection processing steps that have been described with reference to FIGS. 17(*a*) and 17(*b*). First, the track a and the following tracks that are arranged at regular intervals of 30 μm are sequentially searched for any servo error. Once a servo error is detected from the track d, the checkpoint is shifted back to the track e. Then, the track e and the tracks that follow it are searched for any servo error at narrower regular intervals of 10 μm. And if a servo error is detected from the track p for the last time and if no servo errors are detected anymore from the track q, then the defect size measuring section 153 determines that the bubble 11 is present between the track e in which a servo error has occurred and the track q from which no servo errors are detected anymore. In this manner, the size of the bubble 11 (i.e., the size of the defective area) can be substantially determined.

It should be noted that the track e is regarded as being located closest to the track a in which a servo error has occurred and where the search of a defective area is started. On the other hand, the track q is regarded as a track from which no servo error is detected for the first time since the servo error was detected.

Once the beginning and range of the bubble 11 have been determined, the range information processing section 141 shown in FIG. 15 updates the sequential recording range information SRRI, records the bubble 11 as a single SRR and closes that SRR.

It should be noted that if every track were searched for any servo error, then it would take a lot of time to get measurements done on the bubble area. That is why if no servo error has been detected yet, the tracks are checked every 30 μm and after a servo error has been detected, the tracks are checked every 10 μm. As a BD has a track pitch of 0.32 μm, the check to be done every 10 μm corresponds to a check to be done every 30 tracks (=10/0.32). As a result, the size of the bubble area can be measured much more quickly than a situation where every track is checked one by one.

In this manner, the intervals between each pair of tracks to be checked are changed before and after a servo error has been detected. In the following description, the broader interval (which is 30 μm in the example described above) will be referred to herein as a "rough search interval" and the narrower interval (which is 10 μm in the example described above) will be referred to herein as a "fine search interval". Optionally, as for just some of those tracks, every track may be searched for any servo error. For example, once the track q in which no servo errors occur anymore is found as a result of the 10 μm-by-10 μm track checks, every intervening track between that track q and the track p where a servo error occurred for the last time may be searched for any servo error. In that case, the size of the bubble 11 can be measured more accurately.

Next, a method for presuming and recording, based on the location and size of a bubble detected in the reference layer, a bubble defect in another layer, which forms an essential part of the present invention, will be described with reference to FIGS. 20 and 21.

Figure 3:
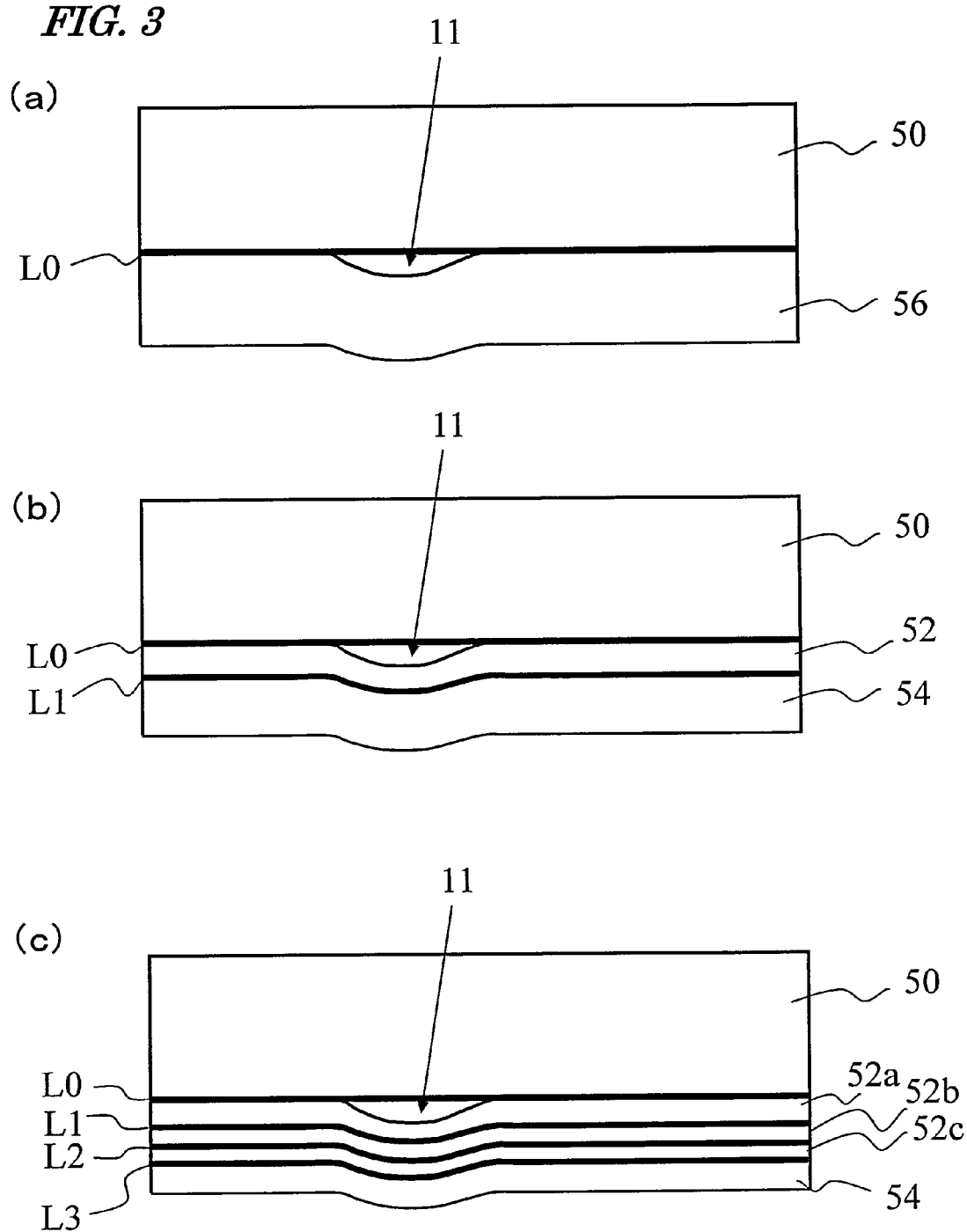
FIGS. 3(a), 3(b) and 3(c) are schematic cross-sectional views illustrating the influences of a bubble on a single-layer disc, a dual-layer disc and a four-layer disc, respectively.

As already described with reference to FIG. 3, the light-transmitting layer is locally raised around a bubble core, and therefore, the light beam that has been incident on such a raised portion gets distorted. Since the light-transmitting layer has a thickness of only 100 μm, pseudo-disturbance components (such a pseudo off-track component and a pseudo defocus component) are generated unintentionally in the TE and FE signals at almost the same location on every information layer.

That is why in a multilayer disc, the focus servo and tracking servo will likely fail in a similar pattern at the same location in the vertical direction on every information layer, thus possibly causing a track jump. For that reason, bubbles need to be detected from both L0 and L1 layers in a dual-layer disc and from all of L0 through L3 layers in a four-layer disc.

According to the present invention, by utilizing the features of a large-scale defect caused by a bubble, the reference layer (which may be any arbitrary information layer) is checked for any bubble, and the location and size of the bubble, if any, are obtained. Next, based on the relation between the structure of the given optical disc (that may be either the parallel path structure or the opposite path structure) and the PSNs, the location of the bubble on each of the other information layers is estimated without making any bubble check on the other layers.

FIG. 20(a) shows how the waveforms of a TE signal and an FE signal vary when the light beam focused on a first information layer L0, which is the reference layer in this example, goes through a bubble 11 that is located in contact with the first information layer L0. On the other hand, FIG. 20(b) shows how the waveforms of a TE signal and an FE signal vary when the light beam goes through a bubble area on a second information layer L1 at the shallower level.

As in a single-layer disc, even if a bubble gets trapped between the optical disc substrate 50 of a dual-layer disc and the first information layer L0 that is located at a depth of 100 μm under the surface, the spherical aberration will vary significantly due to a slight distortion of the light-transmitting layer in the raised portion surrounding the bubble and the influence of the bubble will reach the second information layer L1 because the interval between the first and second information layers L0 and L1 is just 25 μm. In the tracking error (TE) signal, among other things, a similar pseudo-disturbance is produced, no matter whether the light beam spot has passed through the bubble in the first information layer L0 or in the second information layer L1 as shown in FIGS. 20(a) and 20(b).

FIG. 21 shows the procedure of the optical disc surface check processing. The processing to be described below is performed mainly by components included in the surface check section 150 of the optical disc drive 102. First, in Step S150, the search section 151 calculates the end point of the check range based on the start point and size of the check range that have been specified by the high-order controller 104 and then stores it in the defect information buffer 154.

Next, in Step S151, the search section 151 shifts the light beam spot from the start point of the check range to a location, of which the address decreases by the rough search interval of 30 μm.

Subsequently, in Step S152, the search section 151 shifts the light beam spot from the start point of the check range to a location, of which the address increases by the rough search interval.

Then, in Step S153, the search section 151 determines whether or not the current location has gone beyond the end point of the check range. If the answer is NO, the process advances to Step S154 to continue the processing. On the other hand, if the answer is YES, then the process advances to Step S158.

In Step S154, the defect decision section 152 monitors the levels of the tracking error (TE) signal for a period of time corresponding to one round of the target track or even a greater track length, thereby checking the TE signal for any disturbance (i.e., any defect).

Next, in Step S155, the defect decision section 152 determines whether or not the detection threshold value when the TE signal is disturbed and the amount of time it has taken to exceed the threshold value agree with the predetermined defect conditions. As used herein, the defect conditions may be defined as the predetermined detection threshold value P shown in FIG. 16 and the length of the time period Q it has taken to get equal to or smaller than P. If the answer is YES, the process advances to Step S156. Otherwise, the process goes back to the processing step S152.

In Step S156, the search section 151 shifts the checkpoint such that the light beam spot has its address decreased by the rough search interval compared to the current location.

Next, in Step S157, the defect size measuring section 153 measures the size of the defective area. After that, the process goes back to the processing step S152.

If it has been determined in Step S153 that the current location has already gone beyond the end point of the check range, then the process advances to Step S158, in which the defective area is located in another layer. This processing step will be described later with reference to FIG. 23.

Optionally, the threshold values may be changed according to the intended use of the given optical disc. For example, as for an optical disc to be used in such an application that requires highly accurately recorded data (e.g., backup or archival discs for financial institutions), the threshold value is preferably set to be low enough to regard even a relatively small disturbance of a TE signal as a defect. On the other hand, as for an optical disc to be used in such an application that does not require so accurately recorded data (e.g., an optical disc for use to record a normal telecast such as an analog telecast of not so high image quality), the threshold value is preferably set to be high enough to regard only a relatively significant disturbance of a TE signal as a defect.

Hereinafter, it will be described with reference to FIG. 22 how the defect size measuring section 153 measures the size of a defective area. FIG. 22 shows the procedure of the defective area size measuring processing.

First, in Step S160, the defect size measuring section 153 determines whether or not the current location has passed a location that is defined by the sum of the check range end point and a predetermined margin. As used herein, the "predetermined margin" is a correction value to be added as a margin in order to accurately calculate the size of a defective area that is located in the vicinity of the end point of the check range. In this example, the predetermined margin is supposed to be a threshold value for recognizing a number of normal areas that have been detected consecutively as such. For example, the number of those normal areas detected consecutively may be three. If the current location has not yet passed the location that is defined by the sum of the check range end point of the normal area and the predetermined margin, then the process advances to Step S161 to continue the processing. On the other hand, if the current location has already passed that location, then the process jumps to Step S169 in which the size of the defective area is determined. It should be noted that the predetermined margin described above is just an example and could be changed appropriately.

In Step S161, the defect size measuring section 153 shifts the checkpoint in such a direction in which the address increases by the fine search interval. As can be seen easily from portions (a) and (b) of FIG. 10, that shift direction is indicated by the arrow pointing from an inner portion of the BD 1 toward the outer edge thereof.

Next, in Step S162, the defect decision section 152 checks the current location for any defect. And in the next processing step S163, the defect decision section 152 determines whether or not the TE signal satisfies the defect conditions. These processing steps S162 and S163 are the same as the processing steps S154 and S155 described above.

If the defect decision section 152 has determined that the defect conditions are satisfied, then it means that the current location has a defect, and therefore, the process advances to a series of defect recording processing steps S164 through S166. On the other hand, if the defect decision section 152 has not determined that the defect conditions are satisfied, then the process advances to normal area determining processing steps S167 and S168.

In Step S164, the defect size measuring section 153 determines whether or not this is the first time that any defect has been detected since the defect size measurement was started. If the defect has been detected for the very first time, the process advances to Step S165. On the other hand, if the defect has been detected for the second time or a greater number of times, then the process advances to Step S166.

In Step S165, information about the current location is stored as the defective area start point in the defect information buffer 154. If the check range start point has not been passed yet, then the process goes back to the processing step S160 to shift the light beam spot to the next checkpoint.

Next, in Step S166, the defect size measuring section 153 stores the information about the current location as the defective area end point in the defect information buffer 154. As a result, the information about the defective area end point is updated. After that, the process goes back to the processing step S160. By performing the same series of processing steps that start at the processing step S160 all over again, the processing step S166 is carried out again. The defect information buffer 154 functions as a working memory. Every time the processing step S166 is performed, a new piece of information about the defective area end point is stored in the defect information buffer 154.

Next, the normal area determining processing steps S167 and S168 will be described. The processing step S167 and the ones that follow it define what type of processing should be done if the defect conditions failed to be satisfied. In a situation where a defect has been detected based on a servo error but where no servo error has been detected from a certain track, this processing is carried out to determine whether or not that track has become a defect-free normal area.

Specifically, in Step S167, the defect size measuring section 153 calculates the number of times the normal areas have been detected consecutively. As used herein, "the number of times the normal areas have been detected consecutively" means the number of times tracks with no servo errors have been detected consecutively.

Next, in Step S168, the defect size measuring section 153 determines whether or not the number of times of consecutive detection of the normal areas has exceeded a threshold value. In this example, the threshold value is supposed to be three. This means that if normal areas have been detected three times consecutively, then it is determined that the current area is a normal area.

If the number of times of consecutive detection of the normal areas is equal to or greater than the threshold value, the process advances to Step S169, which means determining that the checkpoint has gone beyond the defective area. On the other hand, if the number of times of consecutive detection of the normal areas is less than the threshold value, then the process goes back to the processing step S160, which means determining that the checkpoint has not yet gone beyond the defective area.

In Step S169, the defect size measuring section 153 calculates the size of the defective area based on the locations of the defective area start and end points. In this case, if the defective area start point is located ahead of (i.e., has a smaller address than) the check range start point, then the check range start point is regarded as the defective area start point. On the other hand, if the defective area end point is located beyond (i.e., has a larger address than) the check range end point, then the size of the defective area is calculated with the check range end point regarded as the defective area end point. Then, in Step S170, a list in which the locations of the defective area start and end points are associated with the sizes of the defective area is stored in the defect information buffer 154. By performing these processing steps, the size of the defective area can be measured.

Hereinafter, a method for estimating the location and size of a bubble defect in the second layer L1 and so on based on the location and size of a bubble that have been obtained from the reference layer L0 will be described with reference to FIG. 23.

First, in Step S1401, after the processing on the reference layer L0 has been done, the number of layers stacked in the given optical disc is detected based on a result of an optical disc type recognition process that uses an FE signal, for example. Next, in Step S1402, the DC value of the tracking drive is detected to find the spiral direction and determine whether the given optical disc has parallel paths or opposite paths.

Subsequently, in Step S1403, the LBAs are converted based on a result of this decision so as to transfer a bubble location to another layer by using either PSNs that have always been added together from the inner edge for the parallel paths or PSNs that have been added together while changing the start points between the inner and outer portions of the disc on a layer-by-layer basis for the opposite paths. In a dual-layer disc with a storage capacity of 25 GB per layer (i.e., 50 GB combined), the PSNs of the two layers are:

PSNs of Layer 0 are #020000h through #194E7Eh and
PSNs of Layer 1 are #26B180h through #3DFFFEh The sectors #20000h and #26B180h are positioned at substantially the same radial locations and the sectors #194E7h and #3DFFFE are also positioned at substantially the same radial locations. That is to say, the radial locations of each of these two pairs of sectors agree with each other within the tolerance of eccentricity or within a bonding error range. That is why the respective radial locations and the PSNs satisfy linear functions as shown in FIG. 13(b). Therefore, supposing the functions are identified by f(x) and g(x), respectively, the following relations are satisfied:

The radius of the bubble location on Layer 0=f (PSN of the bubble location on Layer 0)
The radius of the bubble location on Layer 1=g (PSN of the bubble location on Layer 1) and
The radius of the bubble location on Layer 0 the radius of the bubble location on Layer 1

Based on these relations, the following relation can be derived easily:

PSN of the bubble location on Layer 1
=$g^{-1}$ (radius of the bubble location on Layer 1)=
=$g^{-1}$ (radius of the bubble location on Layer 0)=
=$g^{-1}$ (f (PSN of the bubble location on Layer 0))

Next, in Step S1404, it is determined whether the layer for which the bubble location has been calculated is the last layer or not. If the answer is NO, then the bubble locations on the respective layers are calculated based on the relation between the PSNs of the respective layers.

Thereafter, in Step S1405, after the bubble location has been transferred to the predetermined number of layers, the bubble defect locations on the other information layers are normally added to the record in one of the defect management areas 30a, 31a, 32a and 33a of the reference layer L0. It should be noted that if every management area of the reference layer L0 has already been used fully and no data can be added to any management area anymore, then the extra management areas on the next layer could be used. As a result, by using only the reference layer, defective areas on the other layers may be located and their locations may be added to the record in advance.

As described above, according to this preferred embodiment, if a brand new disc has been loaded, the disc is checked for any bubble during its disc loading process that should be done to perform a write operation on it for the first time, thereby adding the detected bubble defect area to the record. That is why as soon as the disc loading process is finished, the defective area can be recognized quickly. Or when a write operation is performed for the second time or when the data that has been written previously is read, the defective area can also be recognized quickly by scanning the management areas during the disc loading process.

In addition, since the layer-to-layer jump range control section 143 (of the DSP 412) can detect the location and size of a defect by reference to the defect information list, it is possible to prevent the light beam spot from moving between the layers where any disturbance has been produced under the influence of a bubble or to shift a focus re-finding area away from the bubble area if the light beam has gone out of focus.

Hereinafter, such processing will be described in detail.

FIGS. 9(a) and 9(b) show the waveforms of FE signals and layer-to-layer jump focus drive pulses in a situation where the layer-to-layer jump has been made where there are no bubbles and in a situation where the layer-to-layer jump has been made where there is a bubble, respectively.

In a situation where there is a bubble, if a jump is made where the influence of that bubble reaches, then the focus error signal FE will not be output normally as shown in FIG. 9(b) under the influence of an aberration caused by the bubble, unlike the situation where there are no bubbles. As a result, a decelerating pulse to be output based on the output level of the focus error signal FE (S-curve) on the information layer as the target layer of the focus jump is no longer output at an appropriate timing. Consequently, the focal point of the light beam will go beyond the target layer and fall outside of the focus control range. Also, suppose the focus finding method adopted is designed such that it is not until a predetermined amount of time has passed since a focus jump operation was started that a decelerating pulse is output. In that case, even if the focus finding operation can be once started on the target layer, the focus control will have an insufficient gain because the amplitude of the focus error signal FE has decreased due to the presence of a bubble. As a result, after the focus has been found once, the lens will produce abnormal vibrations to cause a failure in the focus control and other problems.

As described above, a bubble affects the tracking error signal and focus error signal of every information layer, and will have significant influence on an information layer with a bubble and its adjacent information layers, among other things. According to this preferred embodiment, such an area to be affected by a bubble can be added to the record in advance for every information layer. That is why the layer-to-layer jump range control section 143 (of the DSP 412) can prohibit any move between the layers in a bubble area but guarantee a stabilized move between the layers as long as the jump is made in any other area.

Hereinafter, a method for avoiding a bubble 11 by shifting the point on the time axis (i.e., the location in the tangential direction) in a situation where the light beam spot needs to be moved between the layers to access a sector Q1 on Layer 1 from a sector P1 on Layer 0 will be described as an example.

In accordance with the management information of the bubble defect, jumping prohibited intervals 10a are defined by the dotted lines shown in portions (a) and (b) of FIG. 24.

The start point of each of these intervals has a margin A such that even after the layer-to-layer jump is completed, the focal point never enters the bubble defect area. That is why within the jumping prohibited interval 10a with the margin A, no layer-to-layer jump may be made. That is to say, if it turns out, by checking the current address in response to an access instruction, that it is within the jumping prohibited interval 10a, the jumping should wait until a predetermined number of sectors, or a period of time corresponding to those sectors, pass. And as soon as the jumping prohibited interval 10a is over, the layer-to-layer jump is made quickly. Portion (c) of FIG. 24 is a schematic representation illustrating how this access gets done by extending the tracks horizontally. The light beam spot that is initially located at the point P1 on Layer 0 passes through the bubble 11 without making a jump to reach the point P2, at which the jumping prohibited interval 10a has already passed. That is why the light beam spot is moved quickly from the point P2 to another point Q2 on Layer 1. After the light beam spot has been moved, a tracking control is carried out such that the light beam spot reaches the point Q1 by either making a shortcut access such as a track jump or just going along the spiral tracks. As another example, a method of making a layer-to-layer jump to access the sector Q1 on Layer 1 from the sector P1 on Layer 0 by going in the radial direction and avoiding the bubble 11 will be described.

In accordance with the management information of the bubble defect, a jumping prohibited range 10b is defined by the dashed line shown in portions (a) and (b) of FIG. 25. The start point of this jumping prohibited range 10b is defined such that the light beam spot does not enter the bubble defect area even if the layer-to-layer jump is completed. For example, in accordance with the management information of the bubble defect, the radial range where the bubbles are present as indicated by the hatching in portion (a) of FIG. 25 may be defined as the jumping prohibited range 10b. This range is defined such that no layer-to-layer jump is made within that radial range.

The start point of this jumping prohibited range 10b has a margin B such that the focal point never enters the bubble defect area due to a chucking error of the optical disc or the eccentricity of the optical disc. That is why within the jumping prohibited range 10b with the margin B, no layer-to-layer jump may be made. That is to say, if it turns out, by checking the current address in response to an access instruction, that the light beam spot is currently located within the jumping prohibited range 10b, the light beam spot is once moved outside of the jumping prohibited range 10b. As to whether the light beam spot should go inward or outward, the direction is preferably determined so as to allow the light beam spot to leave the range more quickly.

If the margin B is determined for each multilayer optical disc by measuring the degree of eccentricity of that disc based on the number of times the tracking error signal crosses zero (i.e., the number of times the track is crossed) in a focus ON state while the disc makes one turn during the disc loading process, then the best jumping prohibited range 10b can be defined. As a result, the average access time can be shortened.

Portion (c) of FIG. 25 is a schematic representation illustrating how this access is made in the radial direction of the optical disc. The light beam spot, which is initially located at the point P1 on Layer 0, shifts in the radial direction to the point P2 on the same Layer 0 without making any layer-to-layer jump, jumps from the point P2 to the point Q2 on Layer 1 outside of the jumping prohibited range, and then goes from the point Q2 through the jumping prohibited range again to eventually reach the point Q1. Since P2 is located beyond the jumping prohibited range, the light beam spot can quickly move from P2 to Q2 on Layer 1 with good stability.

The light beam spot never goes through any bubble. For that reason, to move the light beam spot from the reference layer L0 to the second layer L1, the light beam spot needs to be once shifted to a bubble-free area. After that, a seek operation is performed to move the light beam spot to the boundary of the bubble.

In this preferred embodiment, the bubble area is regarded as a defective area. This is because currently bubbles are likely to produce a large-scale defective area more prominently than any other factor. If a defective area is produced due to not a bubble but any other factor, naturally the optical disc apparatus of the present invention can also perform the same operation as the one described above on an optical disc with such a defective area.

In the preferred embodiment described above, the so-called "Layer 0" of a BD (i.e., the deepest layer as viewed from the objective lens) is regarded as the reference layer, and the location and size of a bubble on that Layer 0 are detected based on the tracking error signal, thereby defining a bubble area in Layer 1 as the other layer. This is because as the thickness of the light-transmitting layer of a single-layer disc and that of the light-transmitting layer of Layer 0 of a dual-layer disc are both equal to 100 μm, the given optical disc may be checked for any bubble, no matter whether the disc is a single-layer disc or a dual-layer one, and even before the type of the given optical disc has not been accurately recognized yet. That is why if the given optical disc can be recognized as either a dual-layer disc or a four-layer one to say the least, then the location and size of a bubble may be detected on either Layer 1 or Layer 3, which is the shallowest layer, based on the tracking error signal and then the bubble area(s) on Layer 0 or Layers 1 to 3 as the other layer(s) may also be defined.

In the preferred embodiment described above, a method for doing a bubble check using a tracking error signal TE has been described as an example. However, according to the manufacturing process of the optical disc, the bubble area thereof may also be examined based on a focus error signal FE. Furthermore, if a spherical aberration is produced by moving the collimator lens 210 intentionally, the sensitivity to a bubble can be increased and the bubble can be detected even more accurately. An area where a bubble has gotten trapped comes to have an increased light-transmitting layer thickness as shown in FIGS. 2 and 3, and there is a certain relation between the size and height of a bubble (i.e., the bigger the size of a bubble, the thicker it gets). That is why by moving the collimator lens 210 to a certain degree in the direction in which the thickness of the bubble decreases, the sensitivity can be increased easily.

The present inventors also confirmed that the same effect (i.e., increase in accuracy) could be achieved even by producing not the spherical aberration but astigmatism or coma aberration with a defocus or a lens tilt generated intentionally by moving the objective lens.

In the BD recorder 100 of the preferred embodiment described above, the optical disc is supposed to be a BD-R on which data can be written only once. However, this is just as example. Alternatively, the optical disc may also be a rewritable optical disc (i.e., a so-called "BD-RE").

In the preferred embodiment described above, the defect size measuring section 153 generates in advance the defect information list that indicates there is a defective area on another information layer, which is defined by perpendicularly projecting the defective area in the reference layer to that another layer. However, in cases of immediate recording, for example, there could be no time left to do any bubble check or generate the defect information list during the disc loading process. In that case, a bubble defect to be detected during the recording may be added to the record, and when a recording finalizing process is carried out for the first time, information about that defect may be added to the information about the second layer. By accumulating the information in this manner, when any data is newly added to that optical disc or when the optical disc is reused by erasing the program that was written there for the first time, effects are achieved albeit gradually as the overall duration of the data stored (or the capacity used) increases. That is to say, the more the optical disc is used, the more significantly the effect of the present invention is achieved.

(Embodiment 2)

Hereinafter, a second preferred embodiment of an optical disc apparatus according to the present invention will be described. The optical disc apparatus of this preferred embodiment is an optical disc tester for testing an optical disc to be shipped.

The optical disc tester of this preferred embodiment has the same configuration as the optical disc apparatus shown in FIG. 16. In this preferred embodiment, however, there is no need to write user data on the data area of an optical disc or read the user data from the data area of the optical disc.

Look at FIG. 26 now.

First, in Step S261, an optical disc with two information layers is made by a known process. Specifically, a dual-layer disc may be formed by the method that has already been described with reference to FIGS. 6(a) through 6(d).

Next, in Step S262, the optical disc is subjected to a surface check. That is to say, as already described for the first preferred embodiment, a bubble search is carried out on the reference layer, which is typically the first information layer.

Subsequently, in Step S263, defect identification information, including the location and size of a bubble that has been detected as a result of the search, is written on a predetermined area on the optical disc. In this processing step, an area to be affected by the bubble in an information layer other than the reference layer is located by the location and size of the bubble detected, and the location and size of that area on another information layer are written on the optical disc. When the optical disc has been tested by the optical disc tester of this preferred embodiment, information about the number of the bubbles and the sizes and locations of those bubbles will be written on the defect management areas 30a, 31a, 32a and 33a of the optical disc shown in FIG. 14 if the given optical disc is a BD-RE. On the other hand, if the optical disc is a BD-R, then the information about the number of the bubbles and the sizes and locations of those bubbles will be written on the top one of the temporary optical disc management areas 21a shown in FIG. 14. That information will be transferred from the temporary optical disc management area 21a to the defect management areas 30a, 31a, 32a and 33a through finalizing processing and will eventually be stored in the defect management areas 30a, 31a, 32a and 33a.

The defect management information that has been collected by the manufacturer of the optical disc as a result of this test is preferably stored in a "drive area", which is located closer to the inner edge of the optical disc than the first defect management area (DMA1) 30a shown in FIG. 14 is. The "drive area" is located closer to the inner edge of the optical disc than the DMA area is in the lead-in area 4 shown in FIG. 14, and is an area allocated to each individual manufacturer of optical disc apparatuses. In the drive area allocated to a particular manufacturer, every piece of information that will be needed to operate an optical disc apparatus made by that manufacturer is stored appropriately.

The optical disc tester of this preferred embodiment stores the information shown in FIG. 27 in the drive area. In the example illustrated in FIG. 27, the presence or absence of the defect identification information, the number of the bubbles, the type of the bubbles, and the sizes of the bubbles are stored in the drive area.

Finally, in Step S264, the optical disc in which those pieces of information are stored is shipped.

If the manufacturer of optical discs stores those pieces of information about the bubble in the drive area of an optical disc yet to be shipped, then the bubble search to be done on the reference layer can be skipped by retrieving the defect management information about the bubble from the drive area of that optical disc.

(Optical Disc Loading and Reading Methods)

Hereinafter, it will be described with reference to FIG. 28 how to drive an optical disc apparatus that has been loaded with an optical disc on which defect management information about a bubble has already been stored.

It does not matter whether or not that optical disc has been subjected to the bubble search by the optical disc apparatus for use in this preferred embodiment. As described above, the manufacturer of optical discs may perform a bubble search on an optical disc yet to be shipped, store the defect management information obtained by that search on the optical disc and then ship it. In the drive area of the optical disc for use in this preferred embodiment, stored are pieces of information about the number, locations and sizes of the bubbles. It should be noted that if the start point and end point of a bubble have both been located, the size of the bubble is determined automatically. Also, if the start point and size of a bubble are known, then the end point of the bubble can be located. That is why the information to be added about the location and size of a bubble may be either information about the start and end points of the bubble or information about the start point and size of the bubble.

Hereinafter, a method for driving an optical disc apparatus according to this preferred embodiment will be described.

First of all, the optical disc apparatus is turned ON and loaded with an optical disc in which the defect information has already been added to the record as described above. Then, in Step S265, the spindle motor to rotate the optical disc starts turning (turn spindle ON). Thereafter, in Step S266, a focus control and a tracking control are started. As a result, the drive area in which the defect information is stored as described above can now be accessed with a light beam.

Next, in Step S267, the address is read to determine the current location of the light beam spot. On a BD, the addresses are stored as pre-pits that are defined by the wobbled track grooves. Thereafter, the drive area in the lead-in area as the innermost area on the optical disc is accessed in Step S268 and then it is determined, in Step S269, whether or not the defect management information about a bubble is stored there. Subsequently, in Step S270, it is determined whether or not the defect management information about the bubble has been added in advance to the record on the optical disc. If the answer is YES, the process advances to Step S271 of reading the bubble defect location information from the optical disc. Then, in Step S274, the logical address for reading and writing is converted based on the defect management information that has been retrieved.

On the other hand, if it has been determined in Step S270 that no defect management information about the bubble has been added in advance to the record on the optical disc, then the process advances to Step S272, in which the reference layer is searched for any bubble, thereby defining a bubble area in another information layer by projecting the bubble area of the reference layer to that another layer. Then, in Step S273, the bubble areas in those information layers are presumed to be defective areas and the bubble defect information is added to the record in the drive area of the optical disc.

An optical disc on which the bubble defect information has been added in advance to the record does not have to be subjected to an initial search for a defect such as a bubble, which would take two or three minutes, during the disc loading process. Instead, by reading the defect information in approximately 20 ms, data can be written there with the defective area avoided just as intended. As a result, the disc loading process can get done in a shorter time and the probability of write errors can be reduced to a very low level. On top of that, even at the time of random access, it is also possible to prevent the light beam from leaving a spot on a bubble and going out of focus.

The optical disc apparatus and optical disc of the present invention will contribute greatly to improving the real-time write performance in receiving data and writing it sequentially. According to the present invention, it is possible to prevent a bubble from causing an error, thus realizing stabilized recording performance. Generally speaking, a BD is often used to record a stream content of a digital broadcast. Thus, particularly in a situation where there is little time left for the optical disc apparatus to perform retry processing when an MPEG format needs to be converted into an MPEG-2 format by way of a TS or when re-encoding process need to be carried out in real time in the MPEG-4 format, significant effects are achieved by the present invention.

It should be noted that the present invention is applicable for use in not just BDs but any other type of multilayer disc such as HD-DVDs.

Industrial Applicability

The optical disc apparatus of the present invention searches for a defective area and determines its location and size before starting to write data, and therefore, can write the data with the defective area avoided just as intended. On top of that, since data can also be written smoothly after that, the probability of write errors can be reduced to a very low level. What is more, even at the time of random access, it is possible to prevent the light beam from leaving a spot on any bubble, going out of focus and eventually requiring a retry to be done. This will contribute particularly effectively to improving the real-time write performance in receiving data and writing it sequentially. As a result, the present invention provides a highly reliable optical disc apparatus.

In addition, according to the present invention, the size of the defective area is measured and then the storage area is managed such that no data will be written on that defective area. As a result, it is possible to avoid an unwanted situation where recordable areas are wasted in vain by avoiding the defective areas more than necessarily. That is to say, the storage area of the optical disc can be used more effectively. Furthermore, in a dual- or multilayer disc, the failures of layer-to-layer jump that would otherwise be caused by a bubble can be reduced significantly, thus realizing stabilized access performance.

The invention claimed is:

1. An optical disc apparatus having the ability to read and/or write data from/on an optical disc with having multiple information layers that are stacked one upon the other and an internal defect, the apparatus comprising:

an optical pickup, which irradiates the optical disc with a light beam and which generates a light detection signal based on the light beam that has been reflected from the optical disc;
a surface checking section comprising a search section, a defect decision section and a defect size measuring section; and
a recording range control section,
wherein the surface checking section detects a defective area and produces a defect information list indicating that there is the defective area in the area of the reference layer before data is written on the optical disc,
the search section controls the optical pickup before data is written on a storage area of the optical disc, thereby adjusting the location of the light beam on the optical disc and searches a reference one of the multiple information layers stacked for the defective area in the storage area of the optical disc, the defective area being produced due to the internal defect;
the defect decision section detects an error based on the light detection signal and determines a portion of the storage area, where the error has occurred, as the defective area;
the defect size measuring section measures the size of the defective area in an area of the reference layer and generates the defect information list; and
the recording range control section measures, by reference to the defect information list, the storage area such that no data will be written on a perpendicularly projected area, which is defined by projecting the defective area of the reference layer perpendicularly to another information layer.

2. The optical disc apparatus of claim 1, wherein the defect size measuring section generates, in advance, the defect information list that indicates there is a defective area in the perpendicularly projected area that is defined by projecting the defective area of the reference layer perpendicularly to that another information layer.

3. The optical disc apparatus of claim 1, wherein every time any error occurs, the defect size measuring section generates the defect information list that indicates there is a defective area in the perpendicularly projected area that is defined by projecting the defective area of the reference layer perpendicularly to that another information layer.

4. The optical disc apparatus of claim 1, wherein the recording range control section includes a layer-to-layer jump range control section for controlling an access sequence by reference to the defect information list such that no layer-to-layer jump is made to the perpendicularly projected area that is defined by projecting the defective area of the reference layer perpendicularly to that another information layer.

5. The optical disc apparatus of claim 1, wherein the reference layer is a first information layer that is located at the deepest level.

6. The optical disc apparatus of claim 1, wherein the defect decision section determines a portion of the storage area, where a predicted type of error unique to the defective area has occurred, as the defective area.

7. The optical disc apparatus of claim 6, wherein the defect decision section detects a servo error based on the duration of a period in which the signal level of a servo signal, generated from the light detection signal with a predetermined aberration given to the light beam, is greater than a predetermined threshold value, and determines an area where the servo error has occurred as the defective area.

8. The optical disc apparatus of claim 7, wherein the defect decision section changes the threshold values according to the intended use of the optical disc.

9. The optical disc apparatus of claim 4, wherein the layer-to-layer jump range control section defines a jumping prohibited area with a predetermined margin added for the defective area of the reference layer and for the perpendicularly projected area defined by projecting the defective area perpendicularly to the another information layer, and prohibits making any layer-to-layer jump within the jumping prohibited area.

10. The optical disc apparatus of claim 4, wherein the layer-to-layer jump range control section defines, as a jumping prohibited period, a predetermined period including a period of time it takes for the light beam to pass the defective area of the reference layer and the perpendicularly projected area defined by projecting the defective area perpendicularly to the another information layer.

11. The optical disc apparatus of claim 9, wherein the predetermined margin is determined by the degree of eccentricity of the optical disc.

12. An optical disc tester for testing an optical disc with having multiple information layers that are stacked one upon the other and an internal defect, the tester comprising:
  a search section for searching, before data is written on a storage area of the optical disc, a single reference layer of the multiple information layers stacked for the defective area in the storage area of the optical disc, the defective area being produced due to the internal defect; and
  a defect information list generator for generating a defect information list based on a result of the search by the search section, the defect information list indicating the defective area, which is detected in the single reference layer, and a perpendicularly projected area of each information layer other than the single reference layer, the perpendicularly projected area being defined by projecting the defective area of the single reference layer perpendicularly to each information layer,
  wherein the defect information list generator defines the perpendicularly projected area in each information layer other than the single reference layer according to a location of the single reference layer among the multiple information layers.

13. An optical disc apparatus having the ability to read and/or write data from/on an optical disc with having multiple information layers that are stacked one upon the other and an internal defect, the apparatus comprising:
  a search section for searching, before data is written on a storage area of the optical disc, a single reference layer of the multiple information layers stacked for the defective area in the storage area of the optical disc, the defective area being produced due to the internal defect; and
  a defect information list generator for generating a defect information list based on a result of the search by the search section, the defect information list indicating the defective area, which is detected in the single reference layer, and a perpendicularly projected area of each information layer other than the single reference layer, the perpendicularly projected area being defined by projecting the defective area of the single reference layer perpendicularly to each information layer,
  wherein the defect information list generator defines the perpendicularly projected area in each information layer other than the single reference layer according to a location of the single reference layer among the multiple information layers.

14. The optical disc apparatus of claim 12, wherein the single reference layer is located at the deepest level.

15. The optical disc apparatus of claim 12, wherein the single reference layer is located at the shallowest level.

* * * * *